United States Patent
Urabayashi et al.

(10) Patent No.: US 11,503,595 B2
(45) Date of Patent: Nov. 15, 2022

(54) MOBILE COMMUNICATION METHOD

(71) Applicant: KYOCERA Corporation, Kyoto (JP)

(72) Inventors: Hiroyuki Urabayashi, Yokohama (JP); Chiharu Yamazaki, Tokyo (JP); Hiroyuki Adachi, Kawasaki (JP); Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 24 days.

(21) Appl. No.: 16/364,252

(22) Filed: Mar. 26, 2019

(65) Prior Publication Data

US 2019/0223183 A1 Jul. 18, 2019

Related U.S. Application Data

(63) Continuation of application No. PCT/JP2017/035176, filed on Sep. 28, 2017.
(Continued)

(51) Int. Cl.
*H04W 72/04* (2009.01)
*H04W 92/10* (2009.01)

(52) U.S. Cl.
CPC ..... *H04W 72/0453* (2013.01); *H04W 72/042* (2013.01); *H04W 72/048* (2013.01); *H04W 92/10* (2013.01)

(58) Field of Classification Search
CPC .. H04W 72/048; H04W 72/042; H04W 92/10
See application file for complete search history.

(56) References Cited

U.S. PATENT DOCUMENTS

| | | | |
|---|---|---|---|
| 9,699,779 | B2 | 7/2017 | Marinier et al. |
| 2014/0036851 | A1* | 2/2014 | Seo .................. H04W 24/02 370/329 |

(Continued)

FOREIGN PATENT DOCUMENTS

| | | |
|---|---|---|
| JP | 2015-531220 A | 10/2015 |
| JP | 2016-507923 A | 3/2016 |
| JP | 2016-510554 A | 4/2016 |

OTHER PUBLICATIONS

3rd Generation Partnership Project; Technical Specification Group Radio Access Network; Study on provision of low-cost Machine-Type Communications (MTC) User Equipments (UEs) based on LTE (Release 12), 3GPP TR 36.888 V12.0.0, Jun. 2013, pp. 1-55, Valbonne, France.

(Continued)

*Primary Examiner* — Sharmin Chowdhury
(74) *Attorney, Agent, or Firm* — Studebaker & Brackett PC

(57) ABSTRACT

A mobile communication method for performing predetermined communication between a base station and a user terminal by using a narrow band including 6 resource blocks comprises: transmitting, from the base station to the user terminal, narrow band allocation information allocating a predetermined number of the narrow bands to the user terminal as allocation information of the narrow band used for the predetermined communication; performing by the user terminal, the predetermined communication by using the predetermined number of narrow bands based on the narrow band allocation information; transmitting, from the base station to the user terminal, an RRC message including information specifying a bandwidth supportable by the user terminal; and changing, by the base station, a number of bits of the narrow band allocation information according to the bandwidth supportable by the user terminal. The predeter- (Continued)

mined number of narrow bands are provided within a bandwidth supportable by the user terminal.

14 Claims, 34 Drawing Sheets

Related U.S. Application Data

(60) Provisional application No. 62/402,197, filed on Sep. 30, 2016.

(56) References Cited

U.S. PATENT DOCUMENTS

| | | | |
|---|---|---|---|
| 2015/0195819 A1* | 7/2015 | Kwon | H04L 1/0001 370/329 |
| 2015/0365209 A1* | 12/2015 | Yi | H04L 5/0044 370/329 |
| 2015/0365945 A1 | 12/2015 | Morioka et al. | |
| 2016/0149684 A1* | 5/2016 | Zhao | H04B 7/063 370/252 |
| 2016/0226623 A1* | 8/2016 | Froberg Olsson | H04B 7/0632 |
| 2016/0295568 A1 | 10/2016 | Webb et al. | |
| 2017/0265176 A1 | 9/2017 | Marinier et al. | |
| 2017/0339677 A1* | 11/2017 | Rico Alvarino | H04W 4/70 |
| 2018/0115962 A1* | 4/2018 | Kim | H04W 88/02 |
| 2018/0139725 A1* | 5/2018 | Takeda | H04L 5/0082 |
| 2019/0182837 A1* | 6/2019 | Yao | H04W 72/04 |
| 2021/0022117 A1* | 1/2021 | Yi | H04L 5/0048 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification; 3GPP TS 36.331 V13.2.0; Jun. 2016; pp. 1-623; Release 13; 3GPP Organizational Partners.

Nokia et al.; "Consideration on larger channel bandwidth for FeMTC"; 3GPP TSG-RAN WG1 Meeting #86; R1-166602; May 22-26, 2016; total 2 pages; Gothernburg, Sweeden.

* cited by examiner

FIG. 9

| INDEX | SET |
|---|---|
| 0 | #0,#4 |
| 1 | #1,#5 |
| 2 | #2,#6 |
| 3 | #3,#7 |

FIG. 10

| GROUP | SET |
|---|---|
| 0 | #0,#4,#2,#6 |
| 1 | #1,#5,#3,#7 |

※START INDEXES=0~7
※NUMBER INDEXES=1~4

FIG. 12

| INDEX | SET |
|---|---|
| 0 | #0,#1 |
| 1 | #2,#3 |
| 2 | #4,#5 |
| 3 | #6,#7 |

FIG. 13

| GROUP | SET |
|---|---|
| 0 | #0,#1,#2,#3 |
| 1 | #4,#5,#6,#7 |

※START INDEXES=0～7
※NUMBER INDEXES=1～4

FIG. 18

| SET | #0 | #1 | #2 | #3 | #4 | #5 | #6 | #7 |
|-----|-----|-----|-----|-----|-----|-----|-----|-----|
| BIT | {0,1} | {0,1} | {0,1} | {0,1} | {0,1} | {0,1} | {0,1} | {0,1} |

FIG. 20
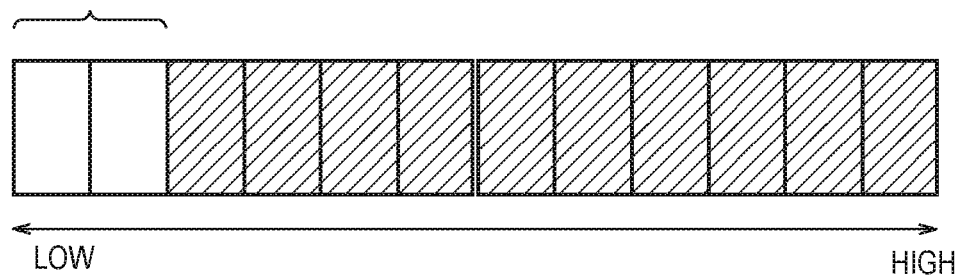
 ··· USED RB    ··· BLANK RB
FIG. 21
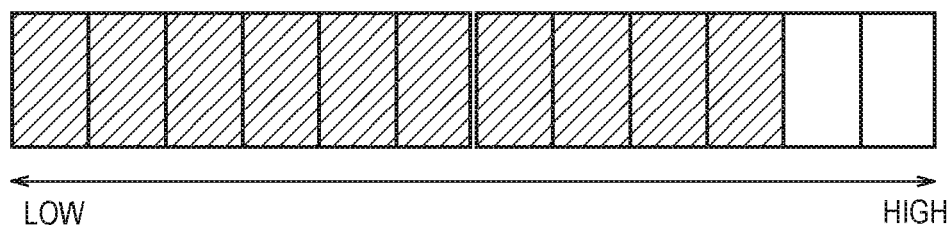
 ··· USED RB    ··· BLANK RB

FIG. 25

| SUBFRAME | HARQ PROCESS #0 | HARQ PROCESS #1 |
|---|---|---|
| INITIAL | FIRST TRANSMISSION | – |
| SECOND | – | FIRST TRANSMISSION |
| INITIAL | RE-TRANSMISSION | – |
| SECOND | – | RE-TRANSMISSION |
| ... | ... | ... |

FIG. 26

| SUBFRAME | HARQ PROCESS #0 | HARQ PROCESS #1 |
|---|---|---|
| INITIAL | FIRST TRANSMISSION | – |
| SECOND | RE-TRANSMISSION | – |
| INITIAL | – | FIRST TRANSMISSION |
| SECOND | – | RE-TRANSMISSION |
| ... | ... | ... |

FIG. 27

| SUBFRAME | HARQ PROCESS |
|---|---|
| INITIAL | FIRST TRANSMISSION |
| SECOND | RE-TRANSMISSION |

※NUMBER OF REPETITION=0

| $\gamma_{max}$ | $\gamma 1$ | $\gamma 2$ | $\gamma 3$ | $\gamma 4$ |
|---|---|---|---|---|
| 1 | 1 | - | - | - |
| 2 | 1 | 2 | - | - |
| 4 | 1 | 2 | 4 | - |
| >=8 | $\gamma_{max}/8$ | $\gamma_{max}/4$ | $\gamma_{max}/2$ | $\gamma_{max}$ |

FIG. 33

| MCS INDEX ($I_{MCS}$) | MODULATION ORDER ($Q'_m$) | TBS INDEX ($I_{TBS}$) | REDUNDANCY VERSION ($r_{vidx}$) |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | RESERVED | | 1 |
| 30 | RESERVED | | 2 |
| 31 | RESERVED | | 3 |

FIG. 34

| MCS INDEX ($I_{MCS}$) | MCS INDEX (REPLACEMENT READ VALUE) | MODULATION ORDER ($Q'_m$) | TBS INDEX ($I_{TBS}$) | REDUNDANCY VERSION ($r_{vidx}$) |
|---|---|---|---|---|
| — | 0 | 2 | 0 | 0 |
| — | 1 | 2 | 1 | 0 |
| — | 2 | 2 | 2 | 0 |
| — | 3 | 2 | 3 | 0 |
| 0 | 4 | 2 | 4 | 0 |
| 1 | 5 | 2 | 5 | 0 |
| 2 | 6 | 2 | 6 | 0 |
| 3 | 7 | 2 | 7 | 0 |
| 4 | 8 | 2 | 8 | 0 |
| 5 | 9 | 2 | 9 | 0 |
| 6 | 10 | 2 | 10 | 0 |
| 7 | 11 | 4 | 10 | 0 |
| 8 | 12 | 4 | 11 | 0 |
| 9 | 13 | 4 | 12 | 0 |
| 10 | 14 | 4 | 13 | 0 |
| 11 | 15 | 4 | 14 | 0 |
| 12 | 16 | 4 | 15 | 0 |
| 13 | 17 | 4 | 16 | 0 |
| 14 | 18 | 4 | 17 | 0 |
| 15 | 19 | 4 | 18 | 0 |
| - | 20 | 4 | 19 | 0 |
| - | 21 | 6 | 19 | 0 |
| - | 22 | 6 | 20 | 0 |
| - | 23 | 6 | 21 | 0 |
| - | 24 | 6 | 22 | 0 |
| - | 25 | 6 | 23 | 0 |
| - | 26 | 6 | 24 | 0 |
| - | 27 | 6 | 25 | 0 |
| - | 28 | 6 | 26 | 0 |
| - | 29 | RESERVED | | 1 |
| - | 30 | RESERVED | | 2 |
| - | 31 | RESERVED | | 3 |

(OFFSET indicated on MCS INDEX column for rows 0–3)

FIG. 35

| MCS INDEX ($I_{MCS}$) | MCS INDEX (REPLACEMENT READ VALUE) | MODULATION ORDER ($Q'_m$) | TBS INDEX ($I_{TBS}$) | REDUNDANCY VERSION ($r_{vidx}$) |
|---|---|---|---|---|
| 0 | 0 | 2 | 0 | 0 |
| - | 1 | 2 | 1 | 0 |
| 1 | 2 | 2 | 2 | 0 |
| - | 3 | 2 | 3 | 0 |
| 2 | 4 | 2 | 4 | 0 |
| - | 5 | 2 | 5 | 0 |
| 3 | 6 | 2 | 6 | 0 |
| - | 7 | 2 | 7 | 0 |
| 4 | 8 | 2 | 8 | 0 |
| - | 9 | 2 | 9 | 0 |
| 5 | 10 | 2 | 10 | 0 |
| - | 11 | 4 | 10 | 0 |
| 6 | 12 | 4 | 11 | 0 |
| - | 13 | 4 | 12 | 0 |
| 7 | 14 | 4 | 13 | 0 |
| - | 15 | 4 | 14 | 0 |
| 8 | 16 | 4 | 15 | 0 |
| - | 17 | 4 | 16 | 0 |
| 9 | 18 | 4 | 17 | 0 |
| - | 19 | 4 | 18 | 0 |
| 10 | 20 | 4 | 19 | 0 |
| - | 21 | 6 | 19 | 0 |
| 11 | 22 | 6 | 20 | 0 |
| - | 23 | 6 | 21 | 0 |
| 12 | 24 | 6 | 22 | 0 |
| - | 25 | 6 | 23 | 0 |
| 13 | 26 | 6 | 24 | 0 |
| - | 27 | 6 | 25 | 0 |
| 14 | 28 | 6 | 26 | 0 |
| - | 29 | RESERVED | | 1 |
| 15 | 30 | RESERVED | | 2 |
| - | 31 | RESERVED | | 3 |

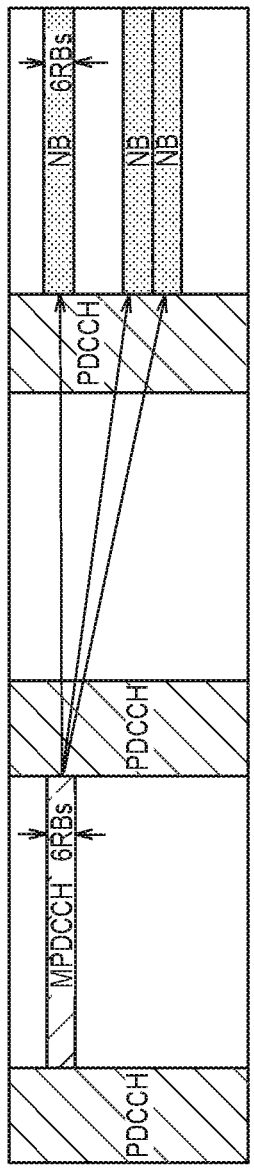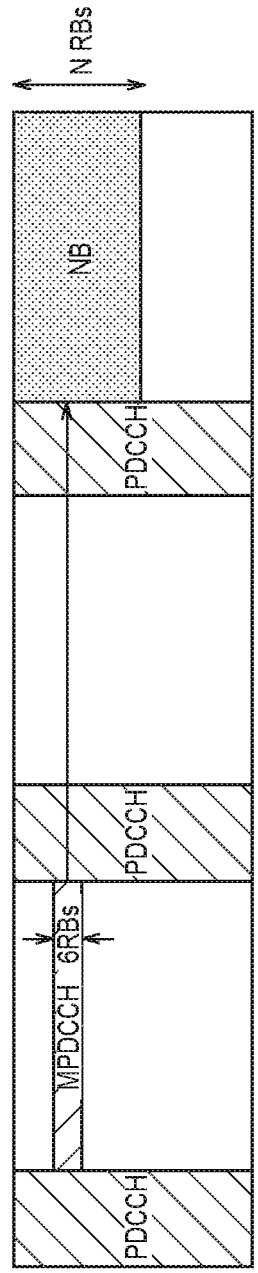
FIG. 38A
FIG. 38B

FIG. 40

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |
| 13 | 224 | 488 | 744 | 1000 | 1258 | 1544 |
| 14 | 256 | 552 | 840 | 1128 | 1416 | 1736 |
| 15 | 280 | 600 | 904 | 1224 | 1544 | 1800 |
| 16 | 328 | 632 | 968 | 1288 | 1608 | 1928 |
| 17 | 336 | 696 | 1064 | 1416 | 1800 | 2152 |
| 18 | 376 | 776 | 1160 | 1544 | 1992 | 2344 |
| 19 | 408 | 840 | 1288 | 1736 | 2152 | 2600 |
| 20 | 440 | 904 | 1384 | 1864 | 2344 | 2792 |
| 21 | 488 | 1000 | 1480 | 1992 | 2472 | 2984 |
| 22 | 520 | 1064 | 1608 | 2152 | 2664 | 3240 |
| 23 | 552 | 1128 | 1736 | 2280 | 2856 | 3496 |
| 24 | 584 | 1192 | 1800 | 2408 | 2984 | 3624 |
| 25 | 616 | 1256 | 1864 | 2536 | 3112 | 3752 |
| 26 | 712 | 1480 | 2216 | 2984 | 3752 | 4392 |
| 26A | 632 | 1288 | 1928 | 2600 | 3240 | 3880 |

FIG. 41

| MCS INDEX $I_{MCS}$ | MODULATION ORDER $Q'_m$ | TBS INDEX $I_{TBS}$ | REDUNDANCY VERSION $r_{vidx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | RESERVED | | 1 |
| 30 | | | 2 |
| 31 | | | 3 |

MOBILE COMMUNICATION METHOD

CROSS-REFERENCE TO RELATED APPLICATION

The present application is a continuation based on PCT Application No. PCT/JP2017/035176 filed on Sep. 28, 2017, which claims the benefit of U.S. Provisional Application No. 62/402,197 (filed on Sep. 30, 2016). The content of which are incorporated by reference herein in their entirety.

TECHNICAL FIELD

The present disclosure relates to a mobile communication method by which predetermined communication is performed between a base station and a second user terminal by using a narrow band of a second bandwidth narrower than a first bandwidth that can be supported by the first user terminal in one unit time.

BACKGROUND ART

In 3rd Generation Partnership Project (3GPP) as a standardization project of a mobile communication system, there has been studied a technique for communicating with a second user terminal using a narrow second bandwidth (for example, 6 physical resource blocks (PRBs)=1.08 MHz) narrower than a first bandwidth (for example, 9 MHz) that a first user terminal can support in one unit time (for example, one subframe=1 msec) (hereinafter referred to as "machine type communication (MTC)") (for example, refer to Non Patent Literature 1).

CITATION LIST

Non Patent Literature

Non Patent Literature 1: 3GPP Technical Report "TR 36.888V 12.0.0" June 2013

SUMMARY

A first aspect is a mobile communication method for performing predetermined communication between a base station and a second user terminal by using a narrow band of a second bandwidth narrower than a first bandwidth supportable by a first user terminal in one unit time, comprising: a step A of transmitting, from the base station to the second user terminal, narrow band allocation information for allocating two or more narrow bands to the second user terminal as allocation information of the narrow band used for the predetermined communication; and a step B in which the second user terminal performs the predetermined communication by using the two or more narrow bands based on the narrow band allocation information. The two or more narrow bands are provided within a bandwidth supportable by the second user terminal.

A second aspect is a mobile communication method for performing predetermined communication between a base station and a second user terminal by using a narrow band of a second bandwidth narrower than a first bandwidth supportable by a first user terminal in one subframe, comprising: a step A of transmitting, from the base station to the second user terminal, narrow band allocation information for allocating two or more subframes to the second user terminal as allocation information of the narrow band used for the predetermined communication; and a step B in which the second user terminal performs the predetermined communication by using the narrow band included in the two or more subframes based on the narrow band allocation information.

A third aspect is a mobile communication method for performing predetermined communication between a base station and a second user terminal by using a narrow band of a second bandwidth narrower than a first bandwidth supportable by a first user terminal in one subframe, comprising: a step A of transmitting, from the base station to the second user terminal, narrow band allocation information of the narrow band used for the predetermined communication; and a step B in which the second user terminal performs the predetermined communication by using the narrow band included in the two or more subframes based on the narrow band allocation information. The step A includes a step of performing downlink communication from the base station to the second user terminal as the predetermined communication in addition to communication of the narrow band allocation information in the one subframe. The narrow band used for the communication of the narrow band allocation information and the narrow band used for the downlink communication are provided within the bandwidth supportable by the second user terminal.

A fourth aspect is a mobile communication method for performing predetermined communication between a base station and a second user terminal by using a narrow band of a second bandwidth narrower than a first bandwidth supportable by a first user terminal in one subframe, comprising: a step A of transmitting, from the base station to the second user terminal, narrow band allocation information used for the predetermined communication; and a step B in which the second user terminal performs the predetermined communication by using the narrow band included in the two or more subframes based on the narrow band allocation information. The step B includes: a step of, when receiving uplink narrow band allocation information as the narrow band allocation information, performing uplink communication from the second user terminal to the base station as the predetermined communication in a subframe after a first offset from a subframe in which the uplink narrow band allocation information is received; a step of, when receiving downlink narrow band allocation information as the narrow band allocation information, performing downlink communication from the base station to the second user terminal as the predetermined communication in a subframe after a second offset from a subframe in which the downlink narrow band allocation information is received; and a step of, when the subframe in which the uplink communication is performed is the same as the subframe in which the downlink communication is performed, shifting one of the subframe in which the uplink communication is performed and the subframe in which the downlink communication is performed in a time direction.

BRIEF DESCRIPTION OF DRAWINGS

FIG. 9 is a diagram illustrating downlink communication according to the embodiment.

FIG. 10 is a diagram illustrating downlink communication according to the embodiment.

FIG. 12 is a diagram illustrating uplink communication according to the embodiment.

FIG. 13 is a diagram illustrating uplink communication according to the embodiment.

FIG. 18 is a diagram illustrating narrow band allocation information according to a second modification example.

FIG. 20 is a diagram illustrating blank information according to the third modification example.

FIG. 21 is a diagram illustrating blank information according to the third modification example.

FIG. 25 is a diagram for explaining scheduling according to the fourth modification example.

FIG. 26 is a diagram for explaining scheduling according to the fourth modification example.

FIG. 27 is a diagram for explaining scheduling according to the fourth modification example.

FIG. 33 is a diagram illustrating an MSC table according to an eighth modification example.

FIG. 34 is a diagram illustrating an MSC table according to the eighth modification example.

FIG. 35 is a diagram illustrating an MSC table according to the eighth modification example.

FIGS. 38A and 38B are diagrams for explaining two options for wider PDSCH/PUSCH for FeMTC service.

FIG. 40 is a diagram illustrating a transport block size table.

FIG. 41 is a diagram illustrating a table of modulation, TBS size, and redundancy version for PUSCH.

DESCRIPTION OF EMBODIMENTS

Figure 1:
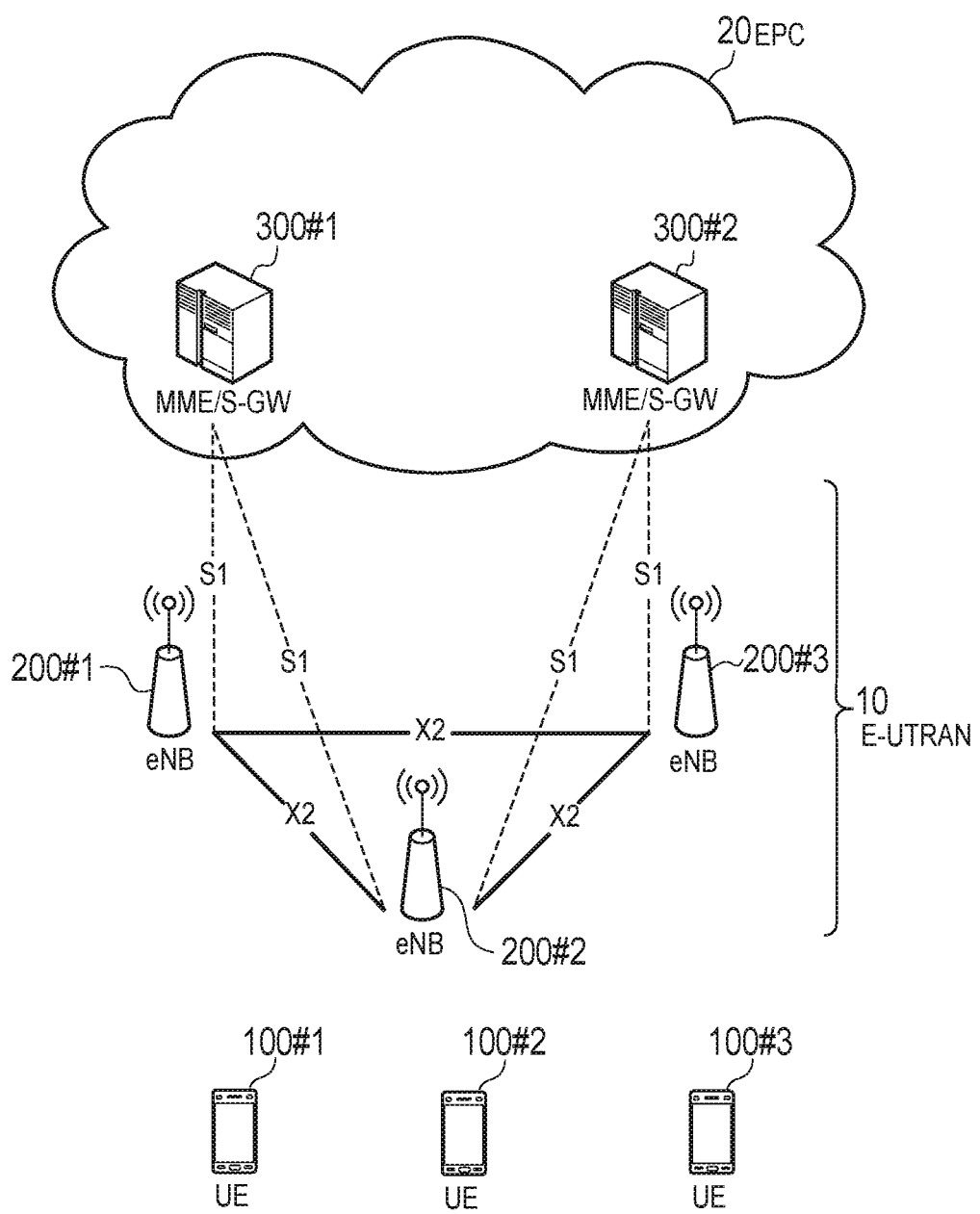
FIG. 1 is a configuration diagram of an LTE system according to an embodiment.

A mobile communication system according to an embodiment is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

[Overview of Disclosure]

The MTC mentioned in the background art has been studied with a target of a second user terminal having a low data amount and low mobility. However, considering a use case where MTC is applied to a wearable terminal, it is desirable to increase the throughput in MTC.

A mobile communication according to the overview of disclosure is a method for performing predetermined communication between a base station and a second user terminal by using a narrow band of a second bandwidth narrower than a first bandwidth supportable by a first user terminal in one unit time.

Firstly, the mobile communication method comprises: a step A of transmitting, from the base station to the second user terminal, narrow band allocation information for allocating two or more narrow bands to the second user terminal as allocation information of the narrow band used for the predetermined communication; and a step B in which the second user terminal performs the predetermined communication by using the two or more narrow bands based on the narrow band allocation information. The two or more narrow bands are provided within a bandwidth supportable by the second user terminal.

In the overview of the disclosure, the base station transmits narrowband allocation information that allocates two or more narrow bands to the second user terminal, to the second user terminal as the narrowband allocation information used for the predetermined communication. That is, the throughput in the predetermined communication can be increased by utilizing two or more narrow bands.

The step A may be a step of transmitting the narrow band allocation information including information specifying the two or more narrow bands.

The mobile communication may comprises: a step of transmitting, from the base station to the second user terminal, a radio resource control (RRC) message including information specifying a bandwidth supportable by the second user terminal; and a step in which the base station changes the number of bits of the narrow band allocation information according to the bandwidth supportable by the second user terminal.

The step A may include a step of transmitting, from the base station to the second user terminal, information for allocating two or more subframes to the second user terminal. The step B may include a step in which the second user terminal performs the predetermined communication by using the narrow band included in the two or more subframes based on the information for allocating the two or more subframes.

The step A may include a step of transmitting, from the base station to the second user terminal, information specifying whether to perform frequency hopping of the narrow band in the two or more subframes.

A correspondence relationship between an index as information specifying a combination of the two or more narrow bands and the combination of the two or more narrow bands may be predetermined.

The predetermined communication may be downlink communication from the base station to the second user terminal. The two or more narrow bands may be separated in a frequency direction.

The index may include a start index that specifies one of a plurality of narrow bands and a number index that specifies the number of the two or more narrow bands.

The plurality of narrow bands may be classified into two or more groups. The two or more narrow bands may be selected based on the number index from among a group including the narrow band specified by the start index.

The predetermined communication may be downlink communication from the base station to the second user terminal. In each of the two or more groups, narrow bands included in each of the two or more groups may be separated in a frequency direction.

The mobile communication method may comprise a step C of transmitting, from the base station to the second user terminal, information specifying a pattern of frequency hopping of the two or more narrow bands and information specifying a resource block to be allocated to the second user terminal in the two or more narrow bands.

The pattern of the frequency hopping applied to the second user terminal may be the same as a pattern of frequency hopping applied to a third user terminal using one narrow band included in the two or more narrow bands. The resource block allocated to the second user terminal in the two or more narrow bands may be different from a resource block allocated to the third user terminal in the one narrow band.

A plurality of narrow bands may be classified into two or more groups. The number of the two or more groups may be determined by the number of times hopping is performed in the frequency hopping applied to the second user terminal. The frequency hopping applied to the second user terminal may be performed between the two or more groups while maintaining a state in which the two or more narrow bands are included in one group.

The step A may include a step of transmitting the narrow band allocation information including blank information specifying a blank resource block not to be allocated to the second user terminal in the two or more narrow bands.

The blank information may includes information specifying a narrow band to which the blank resource block is applied and information specifying a position of the blank resource block.

The two or more narrow bands may be consecutive in the frequency direction. The second user terminal may use consecutive resource blocks in resource blocks included in the two or more narrow bands. The blank information may include information specifying a level of frequency at which the blank resource block is to be arranged, and information specifying the number of the blank resource blocks.

The two or more narrow bands may be consecutive in the frequency direction. The second user terminal may use consecutive resource blocks in resource blocks included in the two or more narrow bands. The blank information may includes information specifying an arrangement of the blank resource block.

Secondly, the mobile communication method comprises: a step A of transmitting, from the base station to the second user terminal, narrow band allocation information for allocating two or more subframes to the second user terminal as allocation information of the narrow band used for the predetermined communication; and a step B in which the second user terminal performs the predetermined communication by using the narrow band included in the two or more subframes based on the narrow band allocation information.

In the overview of the disclosure, the base station transmits, to the second user terminal, narrowband allocation information for allocating two or more subframes to the second user terminal as the narrowband allocation information used for the predetermined communication. Therefore, it is possible to efficiently allocate two or more subframes to the second user terminal while suppressing an increase in narrowband allocation information.

The step B may be a step of performing the predetermined communication by using two or more hybrid automatic repeat request (HARQ) processes.

The narrow band allocation information may include information specifying the number of the two or more subframes.

The narrow band allocation information may include information specifying the narrow band to be allocated to the second user terminal in a first subframe out of the two or more subframes.

The narrow band allocation information may include information specifying a resource block to be allocated to the second user terminal in the narrow band included in a first subframe out of the two or more subframes.

The narrow band allocation information may include information specifying whether to perform frequency hopping of the narrow band in the two or more subframes.

A timing of the frequency hopping of the narrow band may be a timing specified by a radio resource control (RRC) message or a switching timing of repeated transmission in the predetermined communication.

The step B may include a step of, in a case where a setting of performing no repeated transmission is made in the predetermined communication, using the narrow band included in the second and subsequent subframes out of the two or more subframes to perform the predetermined communication using the narrow band included in the first subframe out of the two or more subframes.

The step B may include a step of performing initial transmission by using the two or more HARQ processes and then performing retransmission by using the two or more HARQ processes.

The step B may include a step of performing initial transmission and retransmission by using a first HARQ process included in the two or more HARQ processes and then performing initial transmission and retransmission using a second HARQ process included in the two or more HARQ processes.

The step B may include a step B1 in which, when the second user terminal receives first narrow band allocation information as the narrow band allocation information and then receives second narrow band allocation information as the narrow band allocation information, the second user terminal performs the predetermined communication by using the second narrow band allocation information without using the first narrow band allocation information.

The step B1 may be performed when a hybrid automatic repeat request (HARQ) process of the second narrow band allocation information is the same as an HARQ process of the first narrow band allocation information.

The step B may include a step B2 in which, when the second user terminal receives first narrow band allocation information as the narrow band allocation information and then receives second narrow band allocation information as the narrow band allocation information, the second user terminal performs the predetermined communication by using both the first narrow band allocation information and the second narrow band allocation information.

The step B2 may be performed when a hybrid automatic repeat request (HARQ) process of the second narrow band allocation information is different from an HARQ process of the first narrow band allocation information.

Thirdly, the mobile communication method comprises: a step A of transmitting, from the base station to the second user terminal, narrow band allocation information of the narrow band used for the predetermined communication; and a step B in which the second user terminal performs the predetermined communication by using the narrow band included in the two or more subframes based on the narrow band allocation information. The step A includes a step of performing downlink communication from the base station to the second user terminal as the predetermined communication in addition to communication of the narrow band allocation information in the one subframe. The narrow band used for the communication of the narrow band allocation information and the narrow band used for the downlink communication are provided within the bandwidth supportable by the second user terminal.

In the overview of the disclosure, narrowband used for communication of narrowband allocation information and narrowband used for downlink communication are provided within a bandwidth supportable by the second user terminal. Therefore, it is possible to realize communication of narrowband allocation information and downlink communication in one subframe, and it is possible to shorten the delay time of downlink communication.

The narrow band used for the downlink communication may be specified by a radio resource control (RRC) message or may be predetermined.

The narrow band used for the downlink communication may be specified by an offset value to the narrow band used for the communication of the narrow band allocation information. The offset value may be specified by a radio resource control (RRC) message or may be predetermined.

The second user terminals may be classified into a first group that monitors the narrow band used for the communication of the narrow band allocation information and a second group that does not monitor the narrow band used for the communication of the narrow band allocation information. In the step A, the communication of the narrow band allocation information and the downlink communication with the second user terminal belonging to the first group may be performed.

The communication of the narrow band allocation information and the downlink communication may be repeatedly performed in a plurality of subframes. The subframes in which the communication of the narrow band allocation information may be repeated overlap at least some of the subframes in which the downlink communication is repeated.

The number of the subframes in which the communication of the narrow band allocation information and the downlink communication overlap may be specified by a radio resource control (RRC) message.

Fourthly, the mobile communication method comprises: a step A of transmitting, from the base station to the second user terminal, narrow band allocation information used for the predetermined communication; and a step B in which the second user terminal performs the predetermined communication by using the narrow band included in the two or more subframes based on the narrow band allocation information. The step B includes: a step of, when receiving uplink narrow band allocation information as the narrow band allocation information, performing uplink communication from the second user terminal to the base station as the predetermined communication in a subframe after a first offset from a subframe in which the uplink narrow band allocation information is received; a step of, when receiving downlink narrow band allocation information as the narrow band allocation information, performing downlink communication from the base station to the second user terminal as the predetermined communication in a subframe after a second offset from a subframe in which the downlink narrow band allocation information is received; and a step of, when the subframe in which the uplink communication is performed is the same as the subframe in which the downlink communication is performed, shifting one of the subframe in which the uplink communication is performed and the subframe in which the downlink communication is performed in a time direction.

In the overview of the disclosure, in the case where the subframe for performing uplink communication is the same as the subframe on which downlink communication is performed, the second user terminal shifts one of the subframe that performs uplink communication and the subframe that performs downlink communication in the time direction. Therefore, it is possible to transmit the uplink narrowband allocation information and the downlink narrowband allocation information without being constrained by the first offset and the second offset, and it is possible to shorten the delay time of uplink communication and downlink communication while properly performing uplink communication and downlink communication.

Embodiments

An embodiment will be described by using, as an example, an LTE system based on 3GPP standards as a mobile communication system, below.

(System Configuration)

The system configuration of LTE system according to a first embodiment will be described. FIG. 1 is a configuration diagram of the LTE system according to the embodiment.

As illustrated in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device. The UE 100 performs radio communication with a cell (a serving cell in a case where the UE 100 is in an RRC connected state) formed by the eNB 200. The configuration of the UE 100 will be described later.

The E-UTRAN 10 corresponds to a radio access network. The E-UTRAN 10 includes eNB 200 (an evolved Node-B). The eNB 200 corresponds to a radio base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resources management (RRM) function, a routing function of user data, a measurement control function for mobility control and scheduling and the like. The "cell" is used as a term indicating a smallest unit of a radio communication area. The "cell" may be also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. The E-UTRAN 10 and the EPC 20 constitute a network of the LTE system.

Figure 2:
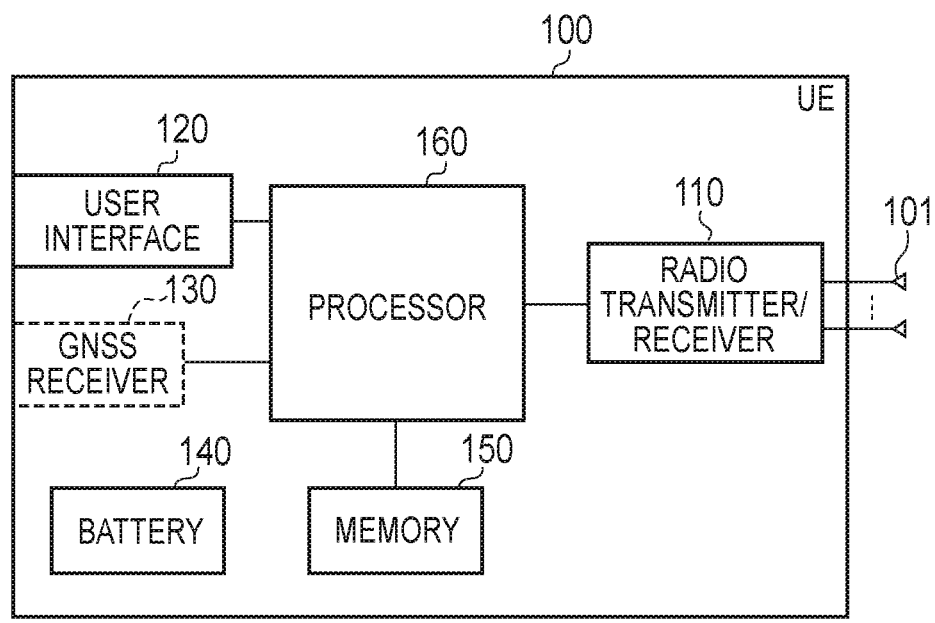
FIG. 2 is a block diagram of a UE 100 according to the embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a controller. The radio transceiver 110 and the processor 160 constitute a transmitter and a receiver. The UE 100 may not necessarily have the GNSS receiver 130. The memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. The radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor and a CPU (Central Processing Unit). The baseband processor performs modulation and demodulation, encoding and decoding and the like on the baseband signal. The CPU performs various types of processes by executing the program stored in the memory 150. The processor 160 may further include a codec that performs encoding and decoding on sound and video signals. The processor 160 executes various types of processes and various types of communication protocols described later.

Figure 3:
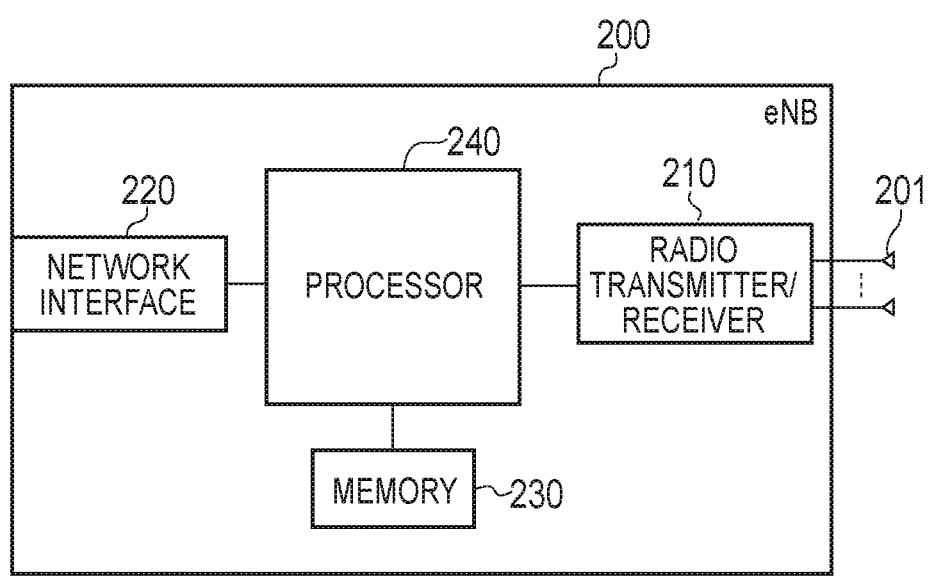
FIG. 3 is a block diagram of an eNB 200 according to the embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a controller. The radio transceiver 210 and the processor 240 constitute a transmitter and a receiver. The memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. The radio transceiver 210 converts a radio signal received by the antenna 201 into a baseband signal (a reception signal), and outputs the baseband signal to the processor 240.

The network interface 220 is connected to the neighboring eNB 200 via the X2 interface, and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor and a CUP. The baseband processor performs modulation and demodulation, encoding and decoding and the like on the baseband signal. The CPU performs various types of processes by executing the program stored in the memory 230. The processor 240 executes various types of processes and various types of communication protocols described later.

Figure 4:
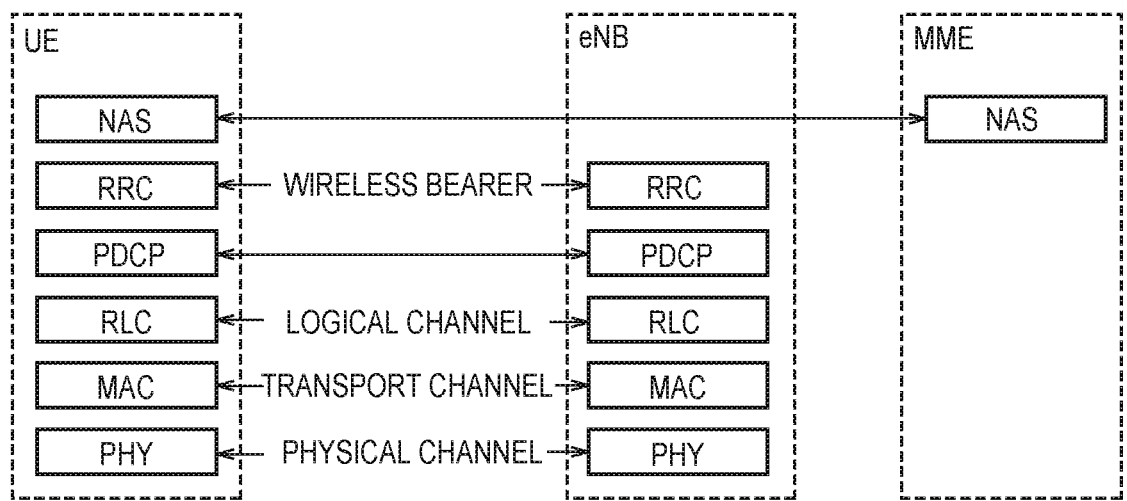
FIG. 4 is a protocol stack diagram of a radio interface according to the embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler. The scheduler determines a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption. It should also be noted that in the PDCP layer, a transmitting entity for transmitting data unit (PDCP PDU) or a receiving entity for receiving data unit (PDCP PDU) is formed.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. When there is no connection (an RRC connection) between the RRC of the UE 100 and the RRC of the eNB 200, the UE 100 is in an RRC idle state.

An NAS (Non-Access Stratum) layer positioned above the RRC layer performs session management, mobility management and the like.

Figure 5:
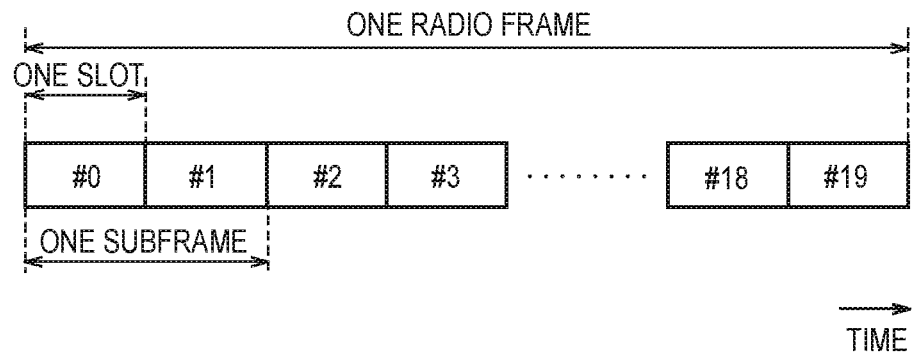
FIG. 5 is a configuration diagram of a radio frame used in the LTE system according to the embodiment.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms. Each slot has a length of 0.5 ms. Each subframe includes a plurality of resource blocks (RBs) in a frequency direction (not shown). Each subframe inclues a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

(Application Scenes)

Figure 6:
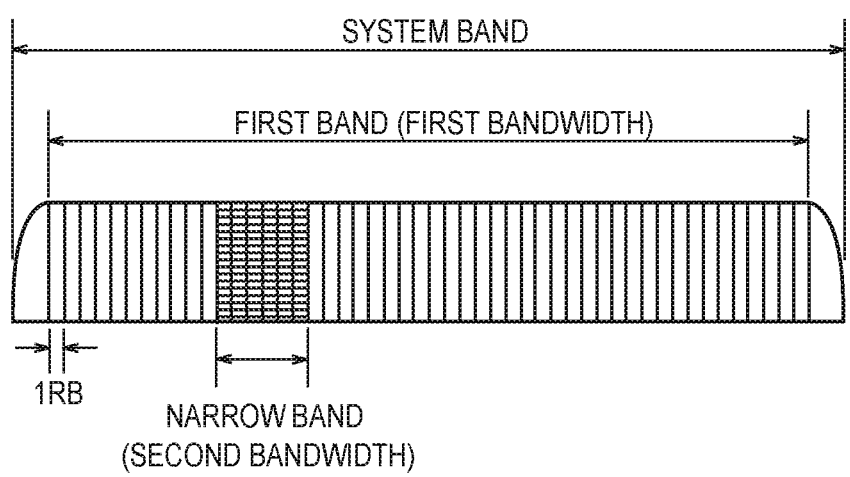
FIG. 6 is a diagram for explaining an application scene according to the embodiment.
Figure 7:
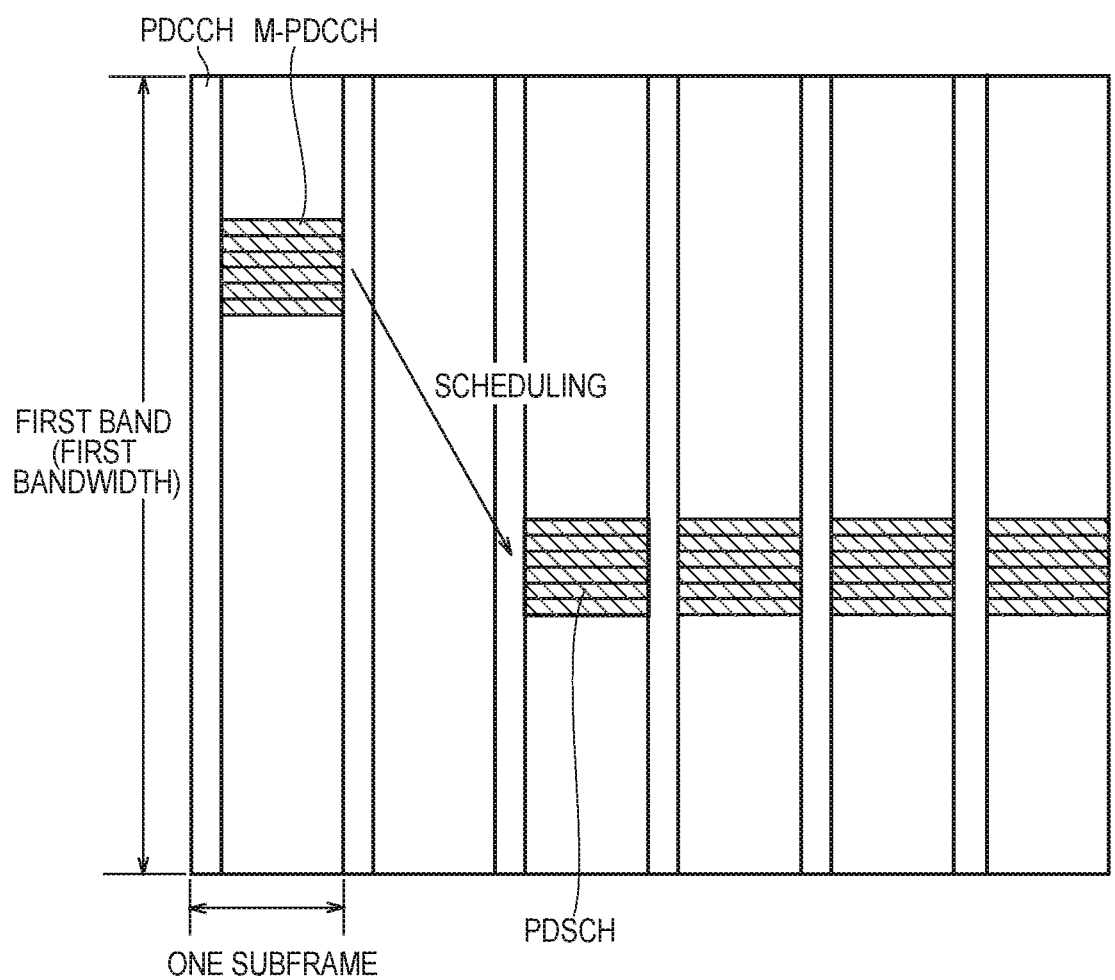
FIG. 7 is a diagram for explaining an application scene according to the embodiment.

Application scenes will be described. FIGS. 6 to 7 are diagrams for explaining application scenes according to an embodiment. Hereinafter, predetermined communication (machine type communication: MTC) in the LTE system will mainly be described.

As illustrated in FIG. 6, the bandwidth of the system band of the LTE system is 10 MHz. The system band includes a first band of a first bandwidth supportable by a general first user terminal, a second band (hereinafter, narrow band) of a second bandwidth supportable by a second user terminal (hereinafter, MTC terminal) corresponding to MTC. The first bandwidth is, for example, 50 physical resource blocks (PRBs)=9 MHz. The second bandwidth is, for example, 6 physical resource blocks (PRBs)=1.08 MHz. The narrow band is a part of the first band. Under this premise, the above-described MTC is a technique for performing predetermined communication (hereinafter, MTC) between the MTC terminal and the eNB 200 using the narrow band.

As illustrated in FIG. 7, in the MTC, the MTC terminal cannot receive the physical downlink control channel (PDCCH), and a predetermined control channel (hereinafter referred to as MTC physical downlink control channel: M-PDCCH) is adopted. The M-PDCCH is used for transmission of predetermined control information (hereinafter referred to as downlink control information: DCI) for use in the MTC. In the MTC, repeated transmission is adopted from the viewpoint of improving the reachability of a signal from a transmission node to a reception node. For example, when the transmission node is the eNB 200 and the reception node is the MTC terminal, physical downlink shared channel (PDSCH) transmission is repeated over a plurality of subframes as illustrated in FIG. 7.

Under such circumstances, there is a need to use the MTC not only for sensors that are supposed to have small capacity data communication, but also for wearable terminals that are expected to have higher capacity data communication than sensors. In order to satisfy the need, it is desired to increase throughput in the MTC.

In relation to the embodiment, for the purpose of increasing the throughput in the MTC, a method of using two or more narrow bands in one unit time is proposed.

More specifically, the eNB 200 transmits narrow band allocation information for allocation of two or more narrow bands to the MTC terminal as narrow band allocation information used for the MTC, from the base station to the MTC terminal (step A). Based on the narrow band allocation information, the MTC terminal performs the MTC using two or more narrow bands (step B). In this case, the two or more narrow bands allocated to the MTC terminal are provided within a bandwidth (for example, 5 MHz) supportable by the MTC terminal. The narrow band allocation information is included in the DCI of the M-PDCCH, for example.

Under this premise, the combination of two or more narrow bands allocated to the MTC terminal may be designated by an index. The index may be included in the narrow band allocation information (DCI of the M-PDCCH).

(Downlink Communication)

Figure 8:
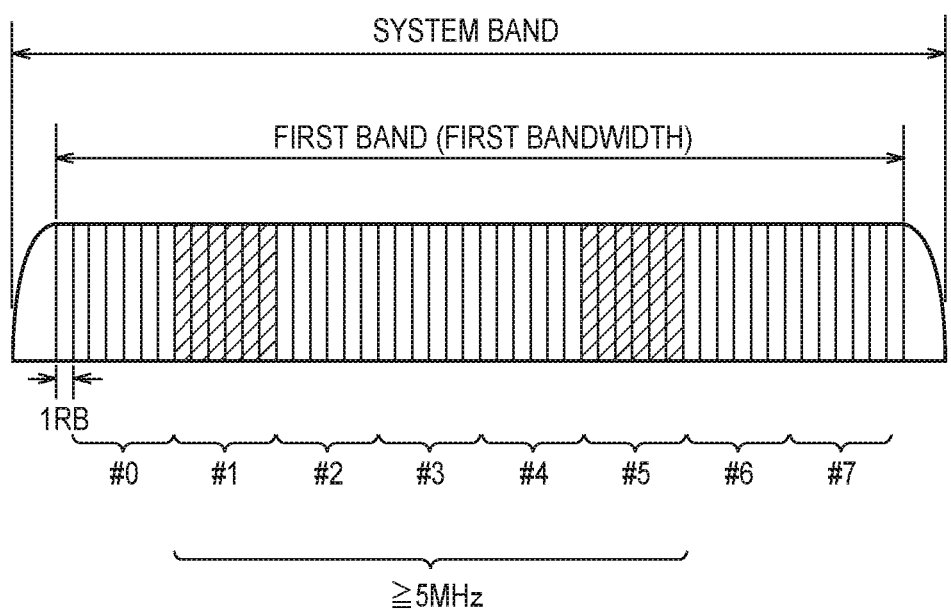
FIG. 8 is a diagram illustrating downlink communication according to the embodiment.

A case where the MTC is downlink communication from the eNB 200 to the MTC terminal will be exemplified. As illustrated in FIG. 8, two or more narrow bands (#1 and #5 in this case) allocated to the MTC terminal may be separated from each other in the frequency direction. As a result, frequency diversity can be obtained. The two or more narrow bands are provided within the bandwidth (for example, 5 MHz) supportable by the MTC terminal. In downlink communication, the index is defined as follows.

First, as illustrated in FIG. 9, the index may be associated with two or more narrow bands that can be allocated to the MTC terminal on a one-to-one basis. In FIG. 9, four indexes are provided, and each of the indexes is associated with two narrow bands on a one-to-one basis. The two narrow bands associated with one of the indexes may be separated from each other in the frequency direction. For example, when the index 1 is included in the narrow band allocation information, the narrow bands #1 and #5 associated with the index 1 are allocated to the MTC terminal.

In this case, the correspondence between the combinations of two or more narrow bands and the indexes may be predefined. The information specifying the correspondence may be provided from the base station. For example, the information specifying the correspondence may be included in a system information block (SIB) defined for the MTC. The information specifying the correspondence may be individually transmitted from the base station. For example, the information specifying the correspondence may be included in the RRC message.

Secondly, as illustrated in FIG. 10, a plurality of narrow bands (#0 to #7 in this case) may be classified into two or more groups (0 and 1 in this case). In each of the groups, the arrangement order of narrow bands is defined cyclically. The narrow bands included in each of the groups may be separated from each other in the frequency direction. In such a case, the indexes include a start index for specifying one of a plurality of narrow bands and a number index for specifying the number of two or more narrow bands. The two or more narrow bands are selected based on the number index from the group including the narrow band specified by the start index. For example, when the start index is 0 and the number index is 2, the group 0 including the narrow band #0 specified by the start index is selected, the narrow band #0 is selected as a start narrow band by the start index from the group 0, and the narrow bands #0 and #4 are selected as two or more narrow bands to be allocated to the MTC terminal by the number index from the group 0. On the other hand, when the start index is 3 and the number index is 3, the group 1 including the narrow band #3 specified by the start index is selected, the narrow band #3 is selected as a start narrow band by the start index from the group 1, and the narrow bands #3, #7 and #1 are selected as two or more narrow bands to be allocated to the MTC terminal by the number index from the group 1.

In this case, when the arrangement order of the narrow bands is cyclic, the value of the number index is not restricted by the value of the start index. For example, even when the start index is #6, the range of possible values of the number index is 1 to 4.

FIG. 10 exemplifies a case where a plurality of narrow bands are classified into two groups when the index includes the start index and the number index. However, the embodiment is not limited to this. A plurality of narrow bands may be classified into three or more groups or may not be classified into groups.

In the case where a plurality of narrow bands are classified into two groups, the group used by the MTC terminal may be specified by an RRC message. For example, in the example illustrated in FIG. 10, when the group 0 is specified by the RRC message, the range of the start index may be 0 to 3, and the range of the number index may be 1 to 4. In such a case, the start index 0 indicates the narrow band #0, the start index 1 indicates the narrow band #4, the start index 2 indicates the narrow band #2, and the start index 3 indicates the narrow band #6.

(Uplink Communication)

Figure 11:
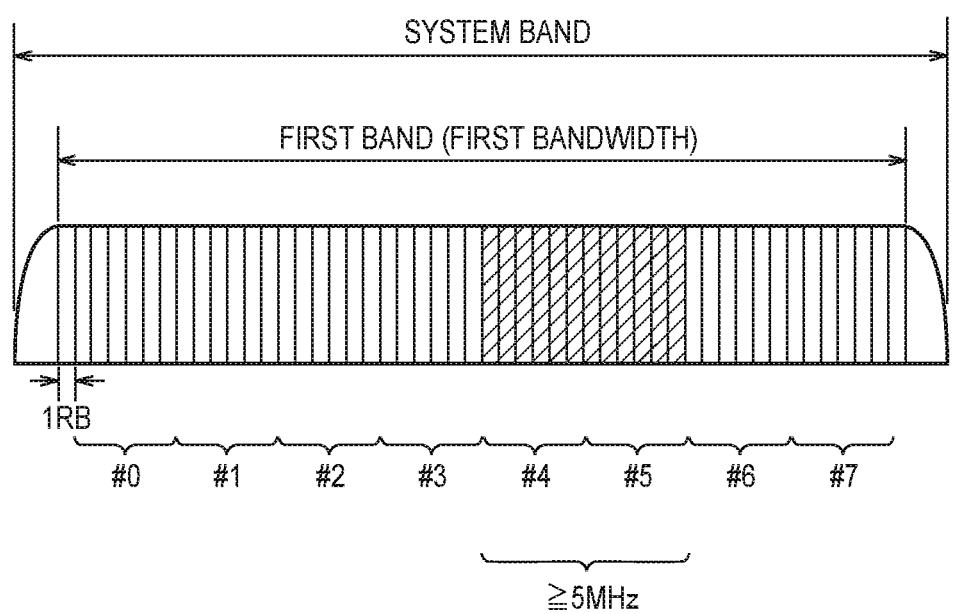
FIG. 11 is a diagram illustrating uplink communication according to the embodiment.

A case where the MTC is uplink communication from the eNB 200 to the MTC terminal will be exemplified. As illustrated in FIG. 11, two or more narrow bands allocated to the MTC terminal (#4 and #5 in this case) may be consecutive in the frequency direction. This makes it possible to suppress the power consumption of the MTC terminal. The two or more narrow bands are provided within the bandwidth (for example, 5 MHz) supportable by the MTC terminal. In uplink communication, the indexes are defined as follows.

First, as illustrated in FIG. 12, the index may be associated with two or more narrow bands that can be allocated to the MTC terminal on a one-to-one basis. In FIG. 12, four indexes are provided, and each of the indexes is associated with two narrow bands on a one-to-one basis. The two narrow bands associated with one of the indexes may be consecutive in the frequency direction. For example, when the index 2 is included in the narrow band allocation information, the narrow bands #4 and #5 associated with the index 2 are allocated to the MTC terminal.

In this case, the correspondence between the combinations of two or more narrow bands and the indexes may be predefined. The information specifying the correspondence may be provided from the base station. For example, the information specifying the correspondence may be included in a system information block (SIB) defined for the MTC. The information specifying the correspondence may be individually transmitted from the base station. For example, the information specifying the correspondence may be included in the RRC message.

Secondly, as illustrated in FIG. 13, a plurality of narrow bands (#0 to #7 in this case) may be classified into two or more groups (0 and 1 in this case). The narrow bands included in each of the groups are consecutive in the frequency direction. In each of the groups, the arrangement order of narrow bands is defined. However, when the narrow bands need to be consecutive in the frequency direction, the arrangement order of the narrow bands is not cyclic. In such a case, the indexes include a start index for specifying one of a plurality of narrow bands and a number index for specifying the number of two or more narrow bands. The two or more narrow bands are selected based on the number index from the group including the narrow band specified by the start index. For example, when the start index is 0 and the number index is 2, the group 0 including the narrow band #0 specified by the start index is selected, the narrow band #0 is selected as the start narrow band by the start index from the group 0, and the narrow bands #0 and #1 are selected as two or more narrow bands to be allocated to the MTC terminal by the number index from the group 0. When the start index is 4 and the number index is 3, the group 1 including the narrow band #4 is selected, the narrow band #4 is selected as the start narrow band by the start index from the group 1, and the narrow bands #4, #5, and #6 are selected as two or more narrow bands to be allocated to the MTC terminal by the number index from the group 1.

In this case, when the arrangement order of the narrow bands is not cyclic, the value of the number index is restricted by the value of the start index. For example, when the start index is #2, the range of possible values of the number index is 1 and 2.

FIG. 13 exemplifies a case where a plurality of narrow bands are classified into two groups when the index includes the start index and the number index. However, the embodiment is not limited to this. A plurality of narrow bands may be classified into three or more groups or may not be classified into groups.

In the case where a plurality of narrow bands are classified into two groups, the group used by the MTC terminal may be specified by an RRC message. For example, in the example illustrated in FIG. 13, when the group 0 is specified by the RRC message, the range of the start index may be 0 to 3, and the range of the number index may be 1 to 4. In such a case, the start index 0 indicates the narrow band #0, the start index 1 indicates the narrow band #1, the start index 2 indicates the narrow band #2, and the start index 3 indicates the narrow band #3. However, when the arrangement order of narrow bands is not cyclic, the value of the number index may be restricted by the value of the start index.

(Mobile Communication Method)

Figure 14:
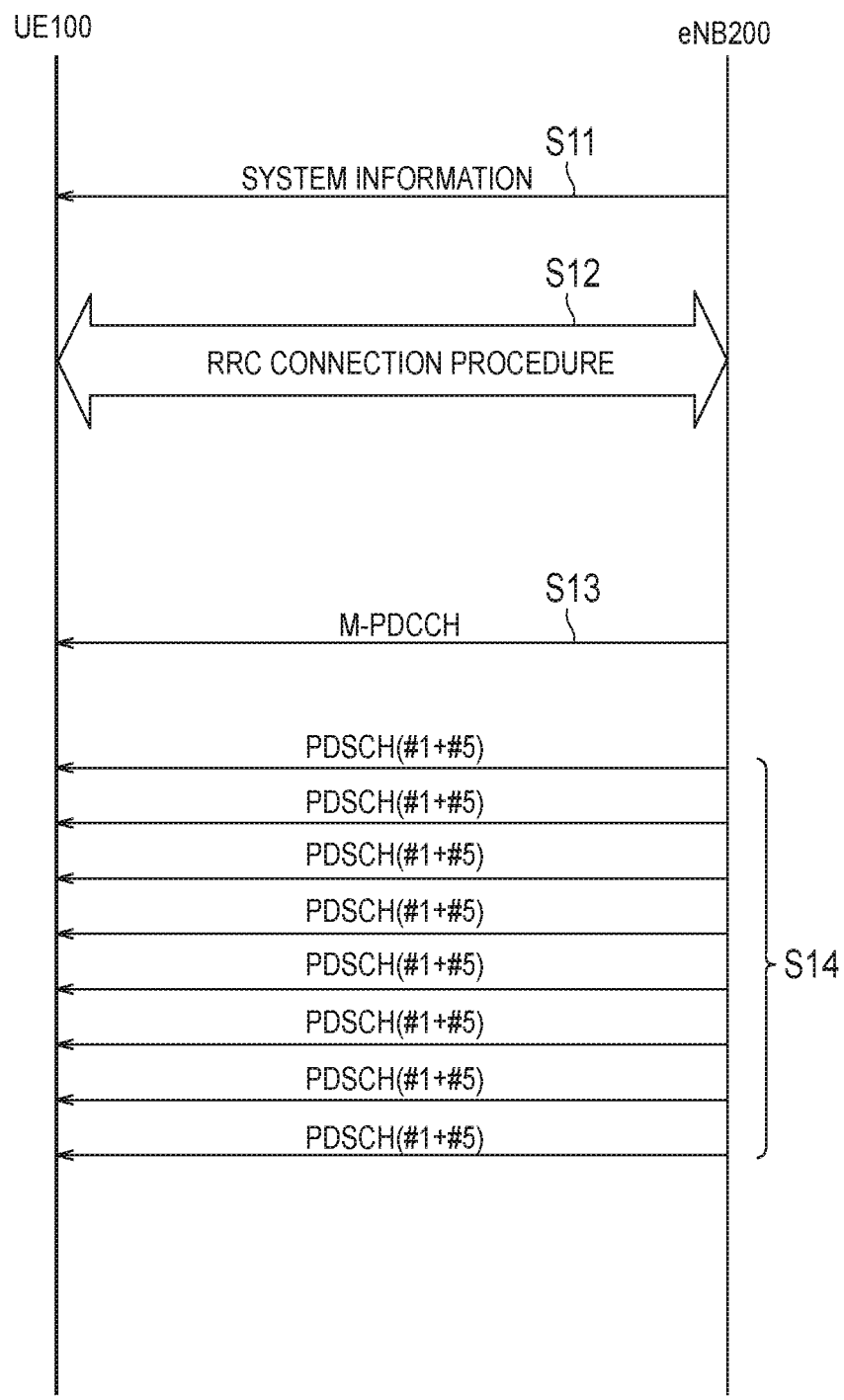
FIG. 14 is a diagram illustrating a mobile communication method according to the embodiment.

Hereinafter, a mobile communication method according to the embodiment will be described. FIG. 14 is a diagram for explaining the mobile communication method according to the embodiment. Referring to FIG. 14, the case where the UE 100 is the MTC terminal and downlink communication is performed as the MTC will mainly be described.

As illustrated in FIG. 14, in step S11, the eNB 200 provides the system information. The system information includes a master information block (MIB) and an SIB. The SIB is an SIB defined for the MTC.

In step S12, the RRC connection procedure is performed. In the RRC connection procedure, communication of RRC messages such as RRC connection request and RRC connection setup is performed.

In step S13, the eNB 200 transmits an M-PDCCH to the UE 100. The DCI of the M-PDCCH includes narrow band allocation information for allocating two or more narrow bands to the MTC terminal. The narrow band allocation information may include the indexes illustrated in FIG. 9 or 10.

In step S14, the eNB 200 repeatedly transmits the PDSCH. For example, when the narrow bands #1 and #5 are allocated to the MTC terminal, the MTC is performed using the narrow bands #1 and #5.

(Operations and Advantageous Effects)

In the embodiment, the eNB 200 transmits the narrow band allocation information for allocation of two or more narrow bands to the MTC terminal as narrow band allocation information used for the MTC from the base station to the MTC terminal. That is, the throughput of MTC can be increased by the use of the two or more narrow bands.

In the embodiment, the narrow band allocation information includes the index for specifying a combination of two or more narrow bands to be allocated to the MTC terminal. Therefore, it is possible to suppress an increase in the amount of DCI data for using the two or more narrow bands.

[First Modification Example]

A first modification example will be described. Differences from the embodiments will be mainly described below.

In relation to the first modification example, descriptions will be given as to a case where frequency hopping of two or more narrow bands is performed between subframes.

Specifically, the eNB 200 transmits to the MTC terminal, information specifying a pattern of frequency hopping of two or more narrow bands and information specifying a resource block to be allocated to the MTC terminal in two or more narrow bands (step C).

In this case, there will be mainly discussed a case where an MTC terminal capable of using two or more narrow bands and a legacy MTC terminal (third user terminal) capable of using one narrow band coexist. In this case, the frequency hopping pattern applied to the MTC terminal may be the same as the frequency hopping pattern applied to the legacy MTC terminal using one narrow band included in two or more narrow bands. A resource block allocated to the MTC terminal in the two or more narrow bands may be other than a resource block allocated to the legacy MTC terminal in the one narrow band. According to this configuration, it is possible to suppress interference between the MTC terminal and the legacy MTC terminal.

The plurality of narrow bands may be classified into two or more groups. The number of two or more groups may be determined by the number of times hopping is performed in the frequency hopping applied to the MTC terminal. The frequency hopping applied to the MTC terminal may be performed between the two or more groups while maintaining a state in which the two or more narrow bands are included in one group. According to this configuration, frequency hopping of two or more narrow bands can be performed while maintaining at least the state where the two or more narrow bands are provided within the bandwidth supportable by the MTC terminal. When the narrow bands included in each group are consecutive in the frequency direction, frequency hopping of two or more narrow bands can be performed while maintaining the continuity of the two or more narrow bands.

Figure 15:
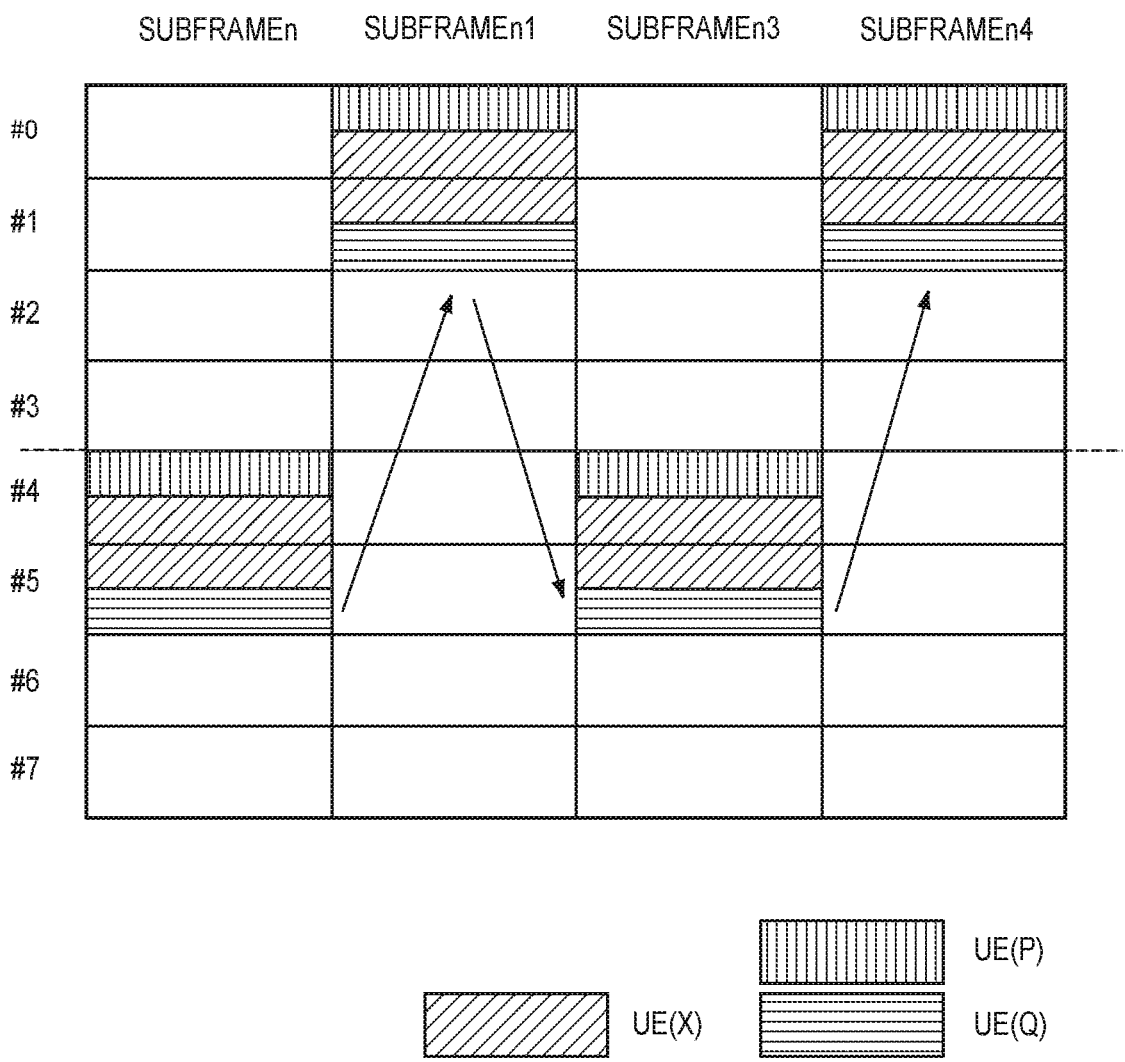
FIG. 15 is a diagram illustrating frequency hopping according to a first modification example.
Figure 16:
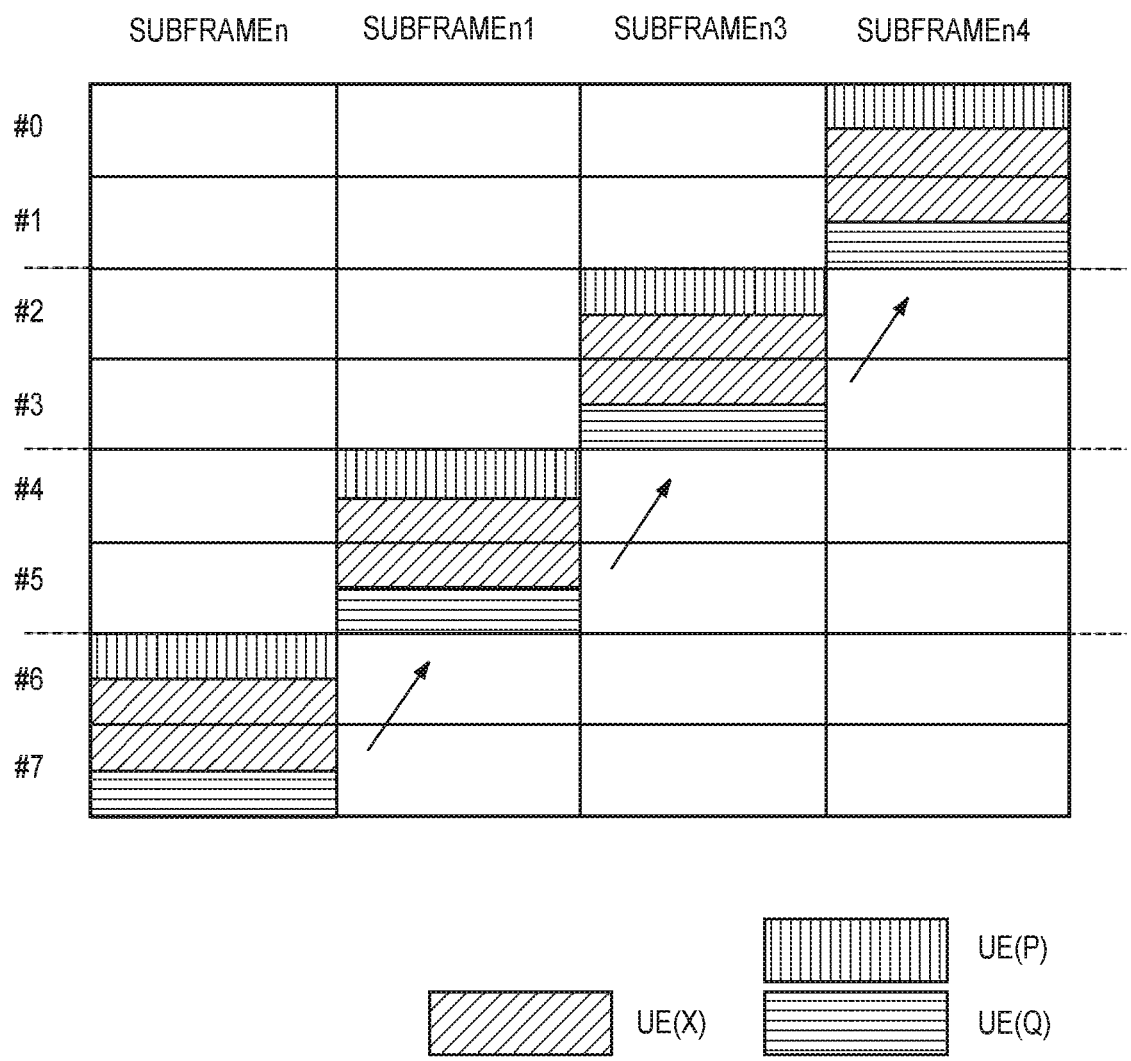
FIG. 16 is a diagram illustrating frequency hopping according to the first modification example.
Figure 17:
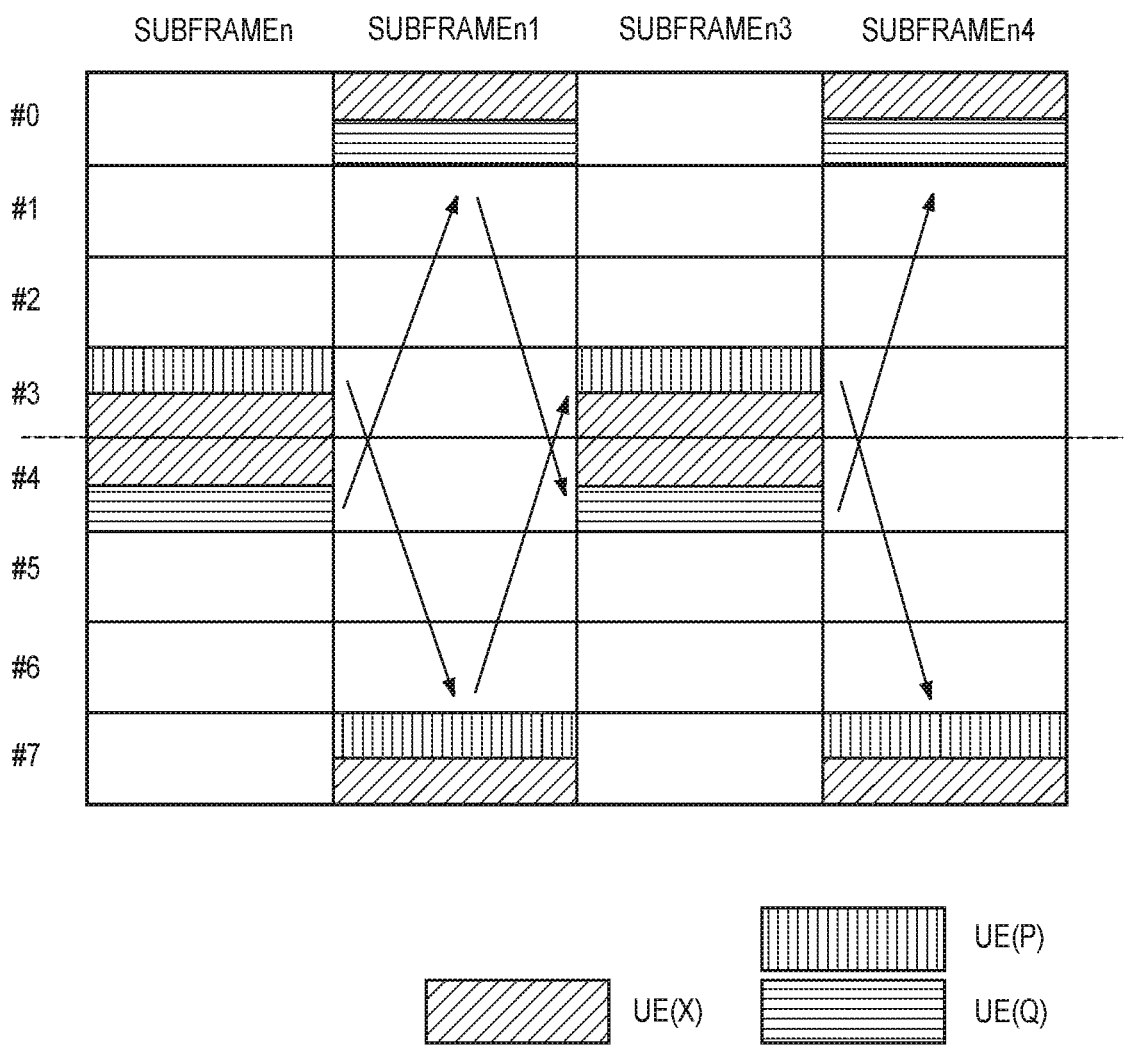
FIG. 17 is a diagram illustrating frequency hopping according to the first modification example.

An example of frequency hopping will be described with reference to FIGS. 15 to 17. Referring to FIGS. 15 to 17, UE (X) represents an MTC terminal that can use two or more narrow bands, and UE (P) and UE (Q) represent legacy MTC terminals that can use only one narrow band.

As illustrated in FIG. 15, when the number of times hopping is performed in the frequency hopping is 2, the number of groups is 2 and the number of narrow bands included in each group is 4. In this case, the plurality of narrow bands is classified into group 0 (narrow bands #0 to #3) and group 1 (narrow bands #4 to #7). The narrow bands included in each of the groups are consecutive in the frequency direction.

As illustrated in FIG. 16, when the number of times hopping is performed in the frequency hopping is 4, the number of groups is 4 and the number of narrow bands included in each group is 2. In this case, the plurality of narrow bands is classified into group 0 (narrow bands #0 and #1), group 1 (narrow bands #2 and #3), group 2 (narrow bands #4 and #5), and group 3 (narrow bands #6 and #7). The narrow bands included in each of the groups are consecutive in the frequency direction.

In the examples illustrated in FIGS. 15 and 16, the frequency hopping applied to the MTC terminal is performed between two or more groups while maintaining a state in which two or more narrow bands are included in one group. Therefore, frequency hopping of two or more narrow bands can be performed while maintaining at least the state where the two or more narrow bands are provided within the bandwidth supportable by the MTC terminal.

On the other hand, as illustrated in FIG. 17, when the state in which two or more narrow bands are included in one group is not maintained, two or more narrow bands cannot be provided within the bandwidth supportable by the MTC terminal (for example, subframe n1 and subframe n4). Therefore, it is preferable that the frequency hopping applied to the MTC terminal is performed between two or more groups while maintaining the state in which two or more narrow bands are included in one group.

[Second Modification Example]

A second modification example will be described. Differences from the embodiments will be mainly described below.

Figure 18:
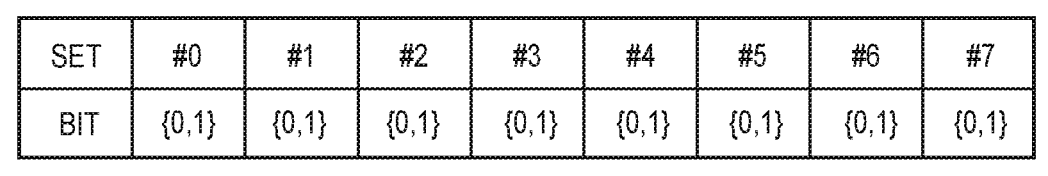

In the second modification example, the eNB 200 transmits narrow band allocation information including mapping information specifying narrow bands to be allocated to the MTC terminal and narrow bands not to be allocated to the MTC terminal. The mapping information is as illustrated in FIG. 18, for example, where the presence or absence of allocation of narrow bands (#0 to #7) is represented by 1 bit.

[Third Modification Example]

A third modification example will be described. Differences from the embodiments will be mainly described below.

In relation to the third modification example, descriptions will be given as to a case where two or more narrow bands are allocated to the MTC terminal but it is not necessary to allocate all resource blocks included in the two or more narrow bands to the MTC terminal. In such a case, the eNB 200 transmits narrow band allocation information including blank information specifying a blank resource block (hereinafter referred to as a blank RB) not to be allocated to the MTC terminal in two or more narrow bands.

Figure 19:
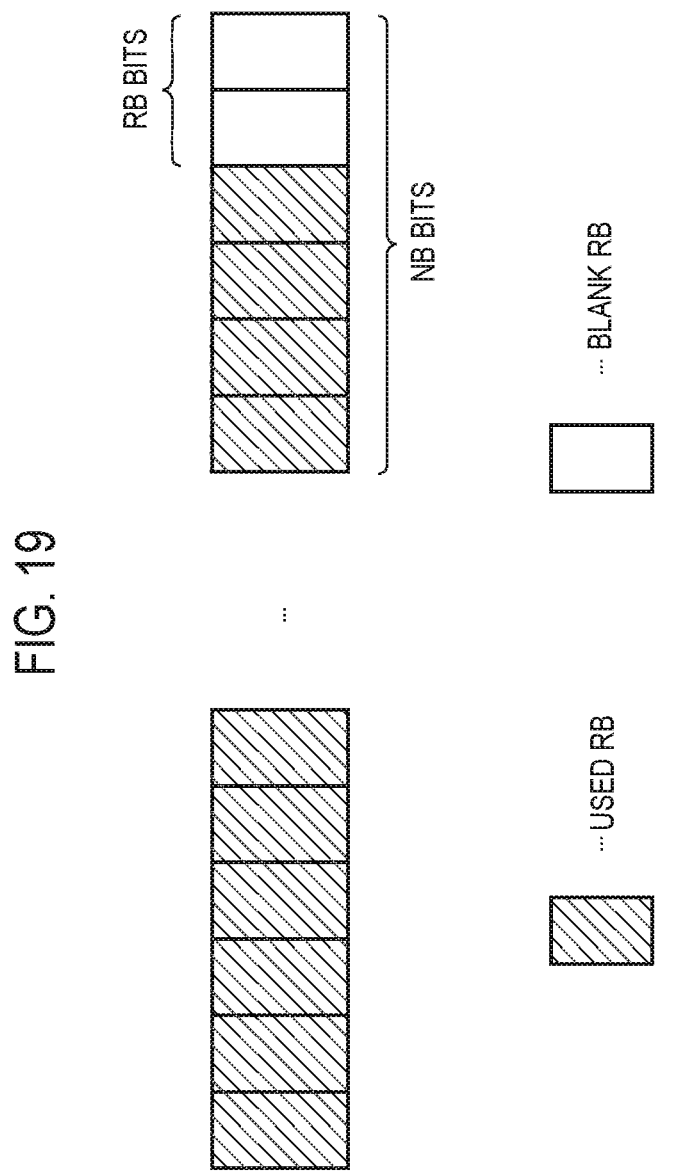
FIG. 19 is a diagram illustrating blank information according to a third modification example.

First, there will be considered a case where two or more narrow bands allocated to the MTC terminal are not consecutive. In this case, as illustrated in FIG. 19, the blank information may include information (NB bits) specifying a narrow band to which the blank RB is applied and information (RB bits) specifying the position of the blank RB. Although not particularly limited, the number of the narrow band to which the blank RB is applied may be 1. Although the number of the narrow bands to which the blank RB is applied may be 2 or more, the number of narrow bands allocated to the MTC terminal may be decreased. The blank information illustrated in FIG. 19 may be applied to a case where two or more narrow bands allocated to the MTC terminal are consecutive.

Secondly, there will be considered a case where two or more narrow bands allocated to the MTC terminal are consecutive. Further, the MTC terminal is configured to use consecutive resource blocks in resource blocks included in two or more narrow bands. In this case, as illustrated in FIGS. 20 and 21, the blank information includes information (freq information) specifying the level of the frequency at which the blank RB is arranged and information specifying the number of blank RBs (the number of bits). The information specifying the level of the frequency at which the blank RB is arranged may be information specifying that the frequency at which the blank RB is arranged is a low frequency as illustrated in FIG. 20 or may be information specifying that the frequency at which the blank RB is arranged is a high frequency as illustrated in FIG. 21. The information specifying the level of the frequency at which the blank RB is arranged may be information for specifying that the frequency at which the blank RB is arranged is both a low frequency and a high frequency by combining the examples illustrated in FIGS. 20 and 21.

Figure 22:
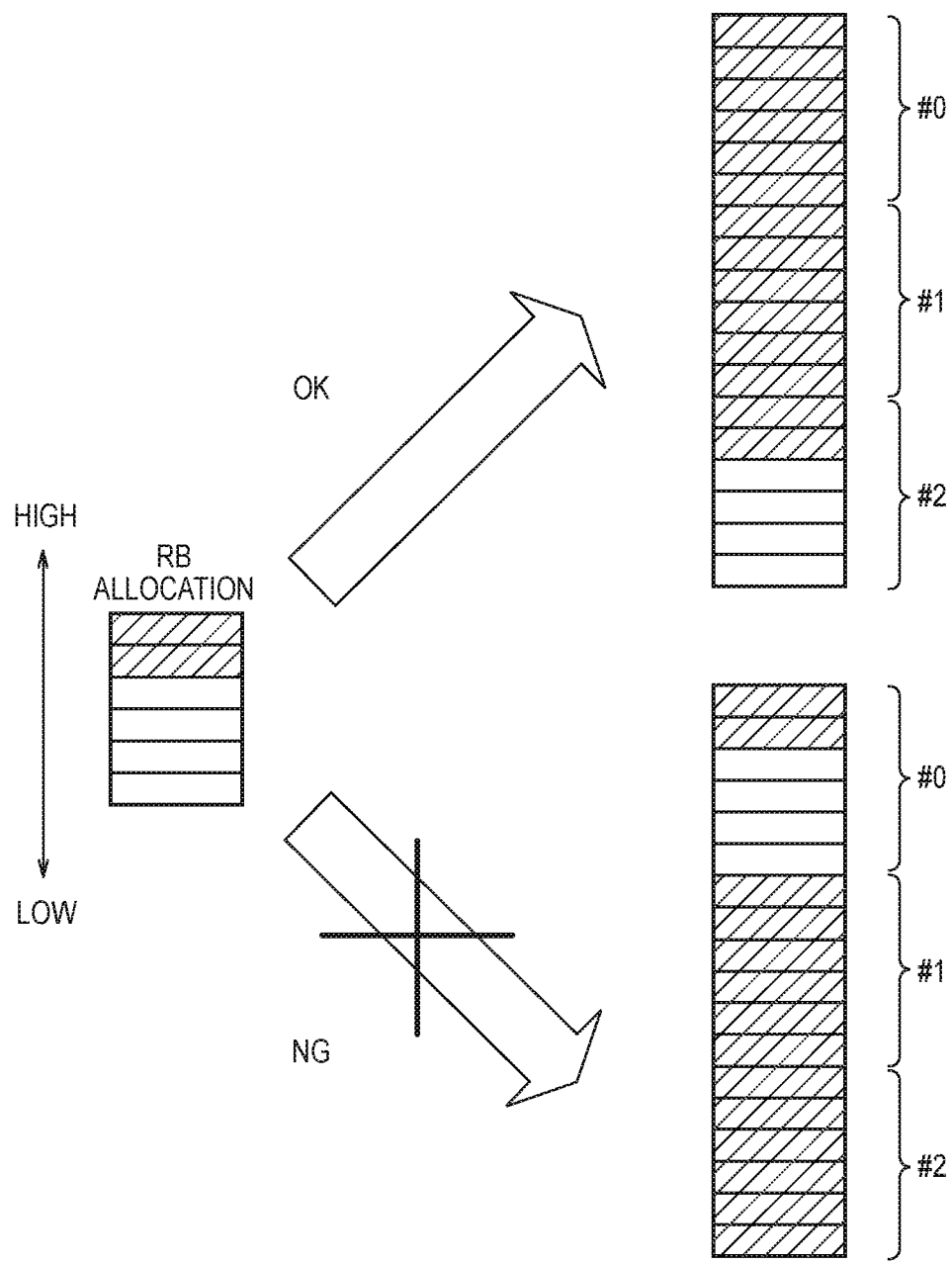
FIG. 22 is a diagram illustrating blank information according to the third modification example.
Figure 23:
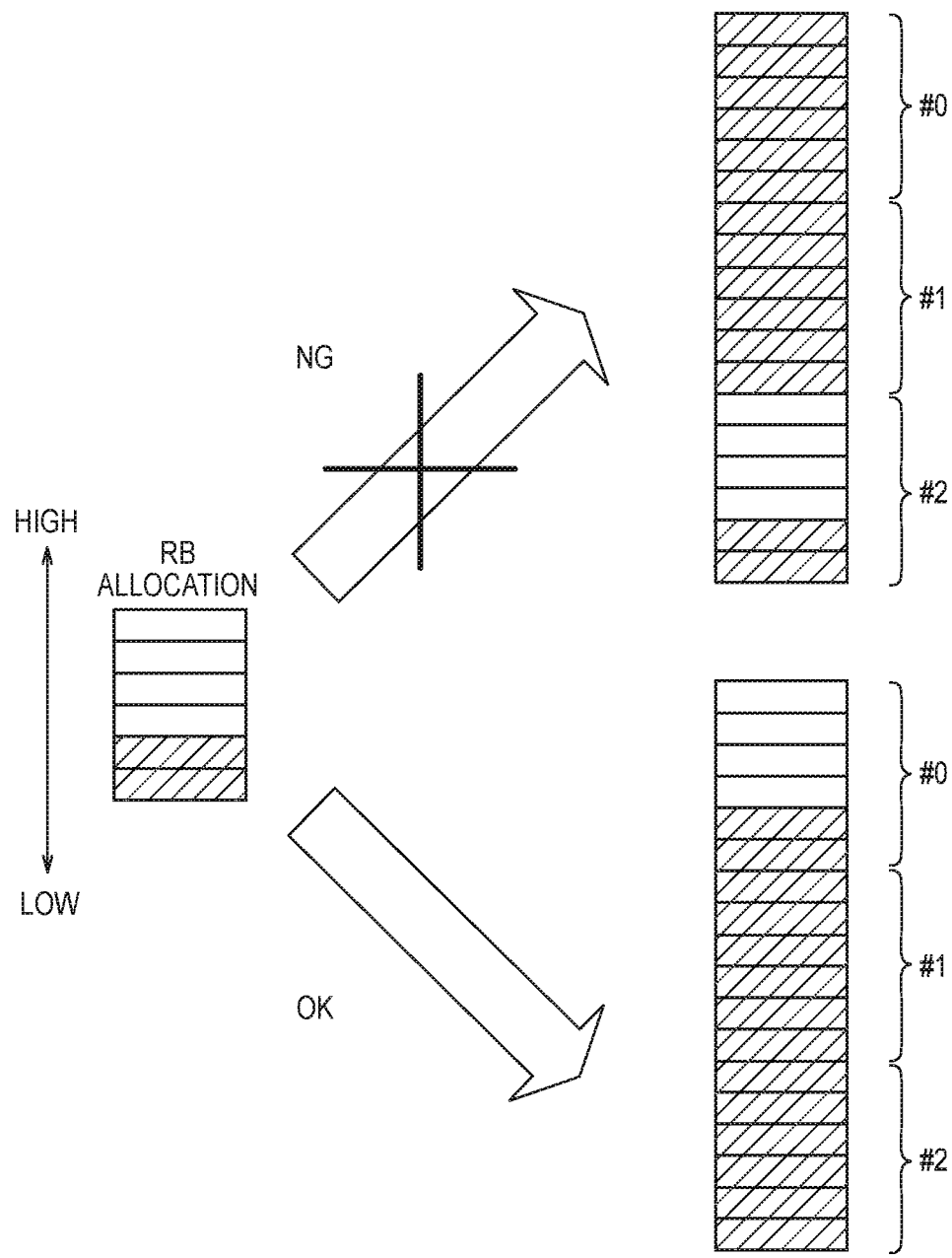
FIG. 23 is a diagram illustrating blank information according to the third modification example.

Thirdly, there is considered a case where two or more narrow bands allocated to the MTC terminal are consecutive. The blank information does not include information specifying the magnitude of the frequency at which the blank RB is arranged (freq information) but includes information indicating the arrangement of the blank RB (RB allocation). As illustrated in FIGS. 22 and 23, the information indicating the arrangement of the blank RB is information indicating the arrangement of blank RBs included in one narrow band. As illustrated in FIG. 22, in the case where the blank RB is arranged on the lower side in the frequency direction, the narrow band to which the blank RB is applied is the narrow band with the lowest frequency (narrow band #2 in this case) among the narrow bands allocated to the MTC terminal in order to ensure the continuity of the resource blocks allocated to the MTC terminal. On the other hand, as illustrated in FIG. 23, in the case where the blank RB is arranged on the higher side in the frequency direction, the narrow band to which the blank RB is applied is the narrow band (narrow band #0 in this case) with the highest frequency among the narrow bands allocated to the MTC terminal to ensure the continuity of the resource blocks allocated to the MTC terminal. In this manner, when the blank information includes information indicating the arrangement of the blank RBs and the continuity of the resource blocks allocated to the MTC terminal is to be ensured, the narrow band to which the blank RB is applied is uniquely determined. In this case, there is no need for information specifying the magnitude of the frequency at which the blank RB is arranged (freq information).

[Fourth Modification Example]

A fourth modification example will be described. Differences from the embodiments will be mainly described below.

in the fourth modification example, the eNB 200 transmits narrow band allocation information for allocation of two or more subframes to the MTC terminal as narrow band allocation information used for the MTC, from the base station to the MTC terminal (step A). Based on the narrow band allocation information, the MTC terminal performs MTC using the two or more subframes (step B).

Figure 24:
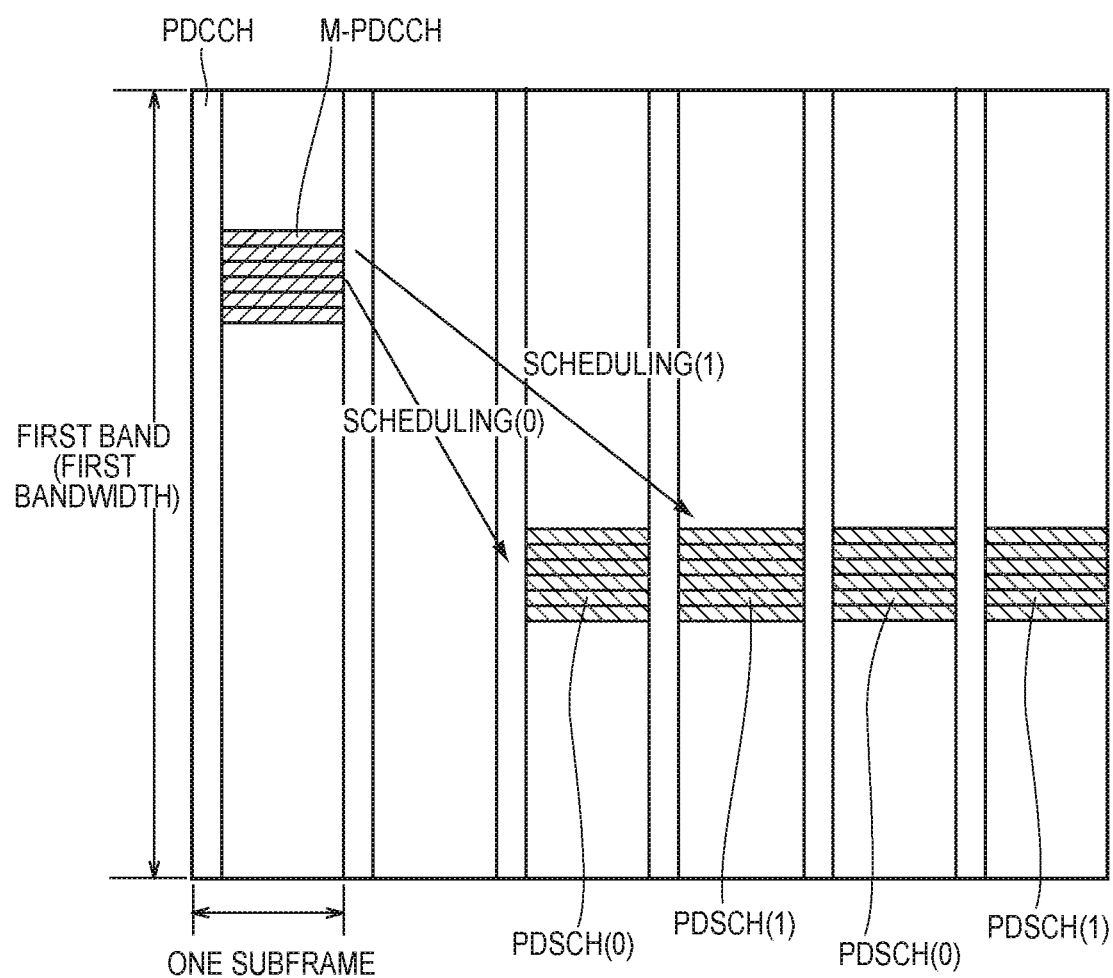
FIG. 24 is a diagram for explaining scheduling according to a fourth modification example.

Specifically, as illustrated in FIG. 24, the eNB 200 performs scheduling (0) and scheduling (1) according to the DCI included in one M-PDCCH. The MTC terminal receives a PDSCH (0) according to the scheduling (0) and receives a PDSCH (1) according to the scheduling (1). The MTC terminal may repeat transmission of the PDSCH (0) and the PDSCH (1). Although downlink communication (PDSCH) is exemplified here, the same technique can be applied to uplink communication (PUSCH).

In this case, the MTC terminal may perform MTC using two or more subframes using two or more hybrid automatic repeat request (HARQ) processes. For example, there will be considered a case where two subframes (initial and second) are allocated to the MTC terminal and the two HARQ processes (#0 and #1) are used by the MTC terminal.

First, as illustrated in FIG. 25, after the initial transmission of the HARQ processes #0 and #1 in the first two subframes (initial and second), the MTC terminal may perform retransmission of the HARQ processes #0 and #1 in the second two subframes (initial and second). The MTC terminal may repeat the retransmission of the HARQ processes #0 and #1 in each of the third and subsequent two subframes (initial and second). According to this configuration, the effect of time diversity can be obtained. In the downlink communication, the MTC terminal may stop the reception of the PDSCH when the reception of the PDSCH is successful.

Secondly, as illustrated in FIG. 26, after the initial transmission and retransmission of the HARQ process #0 in the first two subframes (initial and second), the MTC terminal may perform initial transmission and retransmission of HARQ process #1 in the second two subframes (initial and second). The MTC terminal may repeat the retransmission of the HARQ processes #0 and #1 for every two subframes in the third and subsequent two subframes (initial and second). In the downlink communication, the MTC terminal may stop the reception of the PDSCH when the reception of the PDSCH is successful.

Alternatively, in the case where a setting of performing no repeated transmission is made in the MTC, the narrow bands included in the second and subsequent subframes (second) out of the two or more subframes may be used to perform the predetermined communication that is performed using narrow bands included in the first subframe (initial) out of the two or more subframes. For example, there will be considered a case where the two subframes (initial and second) are allocated to the MTC terminal and one HARQ process is used by MTC terminal.

In this case, as illustrated in FIG. 27, the MTC terminal may perform the initial transmission of the HARQ process in the first subframe (initial) and perform the initial transmission of the HARQ process in the second subframe (second).

In the fourth modification example, the narrow band allocation information may include information specifying the number of the two or more subframes. The number of the HARQ processes may be equal to the number of the two or more subframes, or may be smaller than the number of the two or more subframes.

The narrow band allocation information may include information specifying narrow bands to be allocated to the MTC terminal in the first subframe out of the two or more subframes. The narrow bands allocated to the MTC terminal in the second and subsequent two subframes may be the same as the narrow bands allocated to the MTC terminal in the first subframe. The information specifying narrow bands may be the same as in the embodiment. That is, the information specifying the narrow bands may be an index for specifying a combination of two or more narrow bands. The information specifying narrow bands may be mapping information as in the second modification example.

The narrow bands allocated to the MTC terminal in the second and subsequent subframes may be different from the narrow bands allocated to the MTC terminal in the first subframe. In this case, the narrow band allocation information includes the information specifying narrow bands to be allocated to the MTC terminal in the second and subsequent subframes.

The narrow band allocation information may include information specifying resource blocks to be allocated to the MTC terminal in narrow bands included in the first subframe out of the two or more subframes. The resource blocks allocated to the MTC terminal in the narrow bands included in the second and subsequent subframes out of the two or more subframes may be the same as the resource blocks allocated to the MTC terminal in the narrow bands included in the first subframe. The information specifying the resource blocks to be allocated to the MTC terminal may be blank information as in the third modification example. The information specifying the resource blocks to be allocated to the MTC terminal may be mapping information specifying resource blocks to be allocated to the MTC terminal and resource blocks not to be allocated to the MTC terminal.

The resource blocks allocated to the MTC terminal in the narrow bands included in the second and subsequent subframes may be different from the resource blocks allocated to the MTC terminal in the narrow bands included in the first subframe. The resource blocks allocated to the MTC terminal may be different in each HARQ process. In this case, the narrow band allocation information includes information specifying resource blocks to be allocated to the MTC terminal in the narrow bands included in the second and subsequent subframes.

The narrow band allocation information may include information specifying whether narrow band frequency hopping is to be performed in the two or more subframes. The timing of narrow band frequency hopping may be the timing specified by the RRC message. The timing of narrow band frequency hopping may be the switching timing of repeated transmission in predetermined communication. The pattern of the frequency hopping may be the same as that in the first modification example 1 in consideration of the legacy MTC terminal.

The narrow band allocation information may include information specifying a redundancy version (RV) to be applied in the two or more subframes allocated to the MTC terminal. The RV applied to the second and subsequent subframes may be the same as the RV applied to the first subframe. The RV may be a fixed value. The RV applied to the second and subsequent subframes may vary periodically from the RV applied to the first subframe.

The narrow band allocation information may include information specifying a precoding matrix indicator (PMI) to be applied in the two or more subframes allocated to the MTC terminal. The PMI applied to the second and subsequent subframes may be the same as the PMI applied to the first subframe. The PMI may be a fixed value.

When receiving the first narrow band allocation information as the narrow band allocation information and then receiving second narrow band allocation information as the narrow band allocation information, the MTC terminal may perform MTC using the second narrow band allocation information without using the first narrow band allocation information (step B1). For example, the MTC terminal updates the information on the narrow bands and the resource blocks to be allocated to the MTC terminal, and updates modulation coding scheme (MCS) by the second narrow band allocation information. This processing may be performed when the HARQ process of the second narrow band allocation information is the same as the HARQ process of the first narrow band allocation information.

When receiving the first narrow band allocation information as the narrow band allocation information and then receiving the second narrow band allocation information as the narrow band allocation information, the MTC terminal may perform MTC using both the first narrow band allocation information and the second narrow band allocation information (step B2). For example, the MTC terminal newly sets information on the narrow band and resource blocks to be allocated to the MTC terminal by the second narrow band allocation information, and newly sets modulation coding scheme (MCS). This processing may be performed when the HARQ process of the second narrow band allocation information is different from the HARQ process of the first narrow band allocation information.

In these cases, the eNB 200 may transmit information specifying the reception timing of the M-PDCCH including the second narrow band allocation information to the MTC terminal. This information is provided by an RRC message, for example. The MTC terminal receives the M-PDCCH including the second narrow band allocation information at the reception timing notified by the eNB 200.

The narrow bands allocated by the first narrow band allocation information and the narrow bands allocated by the second narrow band allocation information are provided within the bandwidth supportable by the MTC terminal. The resource blocks allocated by the first narrow band allocation information and the resources allocated by the second narrow band allocation information are allocated so as not to overlap each other.

(Mobile Communication Method)

Figure 28:
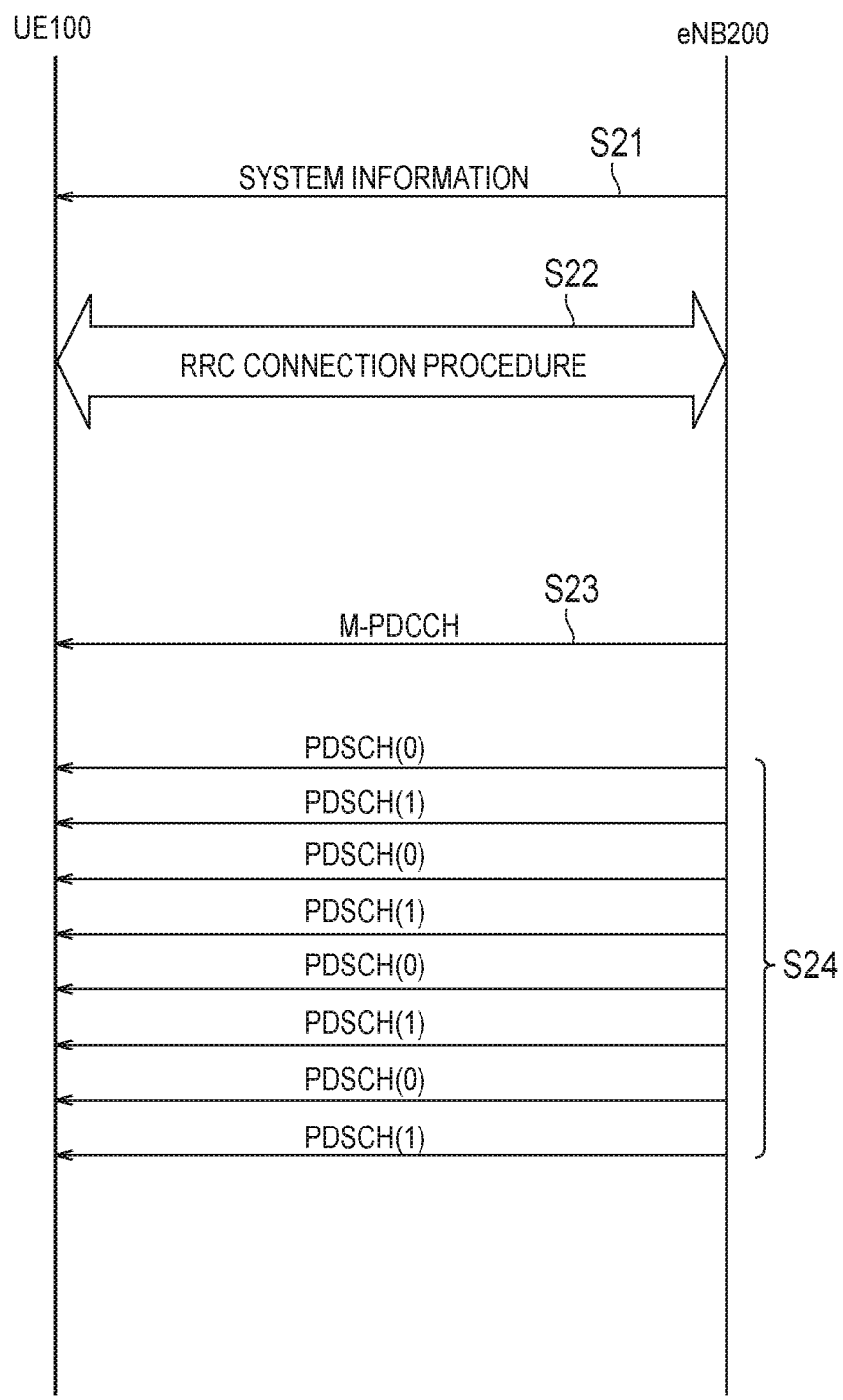
FIG. 28 is a diagram illustrating a mobile communication method according to the fourth modification example.

A mobile communication method according to the fourth modification example will be described. FIG. 28 is a diagram for explaining a mobile communication method according to the fourth modification example. Referring to FIG. 28, the case where the UE 100 is the MTC terminal and the downlink communication is performed as the MTC will be mainly described.

As illustrated in FIG. 28, in step S21, the eNB 200 provides system information. The system information includes a master information block (MIB) and an SIB. The SIB is an SIB defined for the MTC.

In step S22, the RRC connection procedure is performed. In the RRC connection procedure, communication of RRC messages such as RRC connection request and RRC connection setup is performed.

In step S23, the eNB 200 transmits an M-PDCCH to the UE 100. The DCI of the M-PDCCH includes narrow band allocation information for allocating two or more subframes to the MTC terminal. The narrow band allocation information may include information for allocating narrow bands to the MTC terminal.

In step S24, the eNB 200 transmits PDSCHs ((0) and (1) in this case) in two or more subframes. The information transmitted in the PDSCHs (0) and (1) may be the information illustrated in FIG. 25 or 26. The information transmitted in the PDSCHs (0) and (1) may be the information illustrated in FIG. 27.

[Fifth Modification Example]

Hereinafter, a fifth modification example will be described. Differences from the embodiments will be mainly described below.

Figure 29:
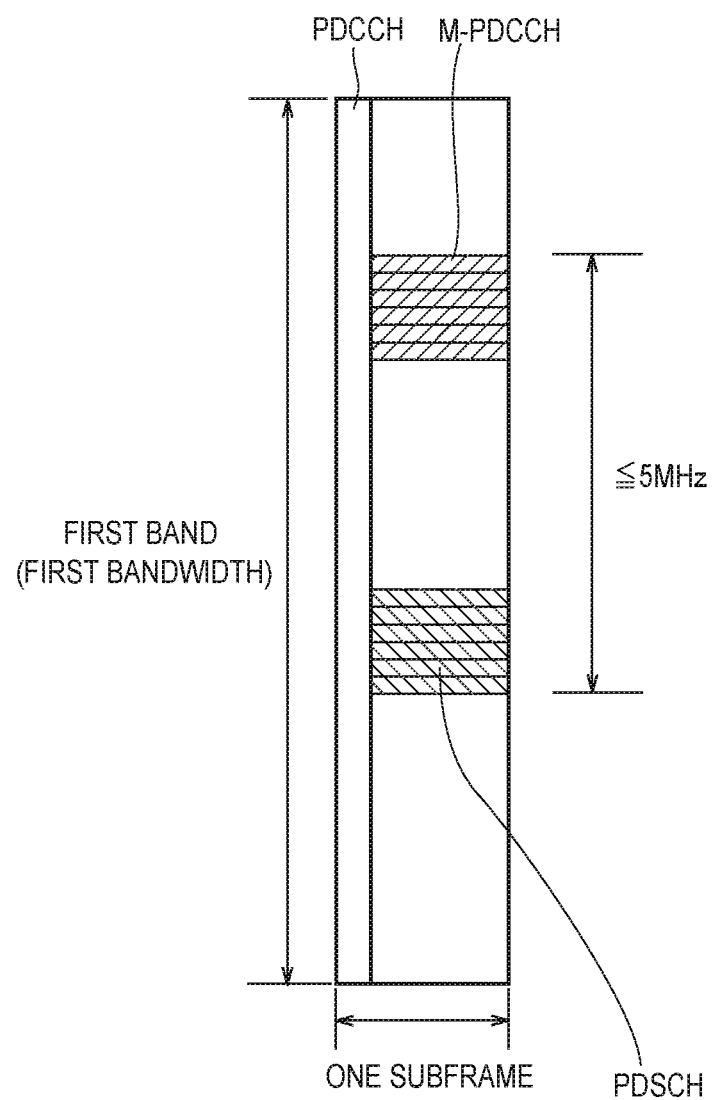
FIG. 29 is a diagram for explaining scheduling according to a fifth modification example.

In the fifth modification example, as illustrated in FIG. 29, the eNB 200 performs downlink communication as MTC in addition to communication of narrow band allocation information in one subframe. The narrow band used for communication of the narrow band allocation information and the narrow band used for downlink communication are provided within the band width (for example, 5 MHz) supportable by the MTC terminal.

The narrow band used for downlink communication may be specified by an RRC message. The narrow band used for downlink communication may be predefined.

The narrow band used for downlink communication may be specified by the offset value to the narrow band used for communication of the narrow band allocation information. The offset value may be specified by a radio resource control (RRC) message. The offset value may be predefined. The offset value is information specifying how much the narrow band used for downlink communication is shifted from the narrow band used for communication of the narrow band allocation information in the frequency direction. The narrow band used for downlink communication may be shifted to the lower frequency in the frequency direction or may be shifted to the higher frequency in the frequency direction.

The MTC terminals may be classified into a first group for monitoring the narrow band used for communication of the narrow band allocation information and a second group for not monitoring the narrow band used for communication of the narrow band allocation information. An MTC terminal belonging to the first group is an MTC terminal provided with the narrow band and narrow band allocation information used for downlink communication within a bandwidth supportable by the MTC terminal. The eNB 200 performs both communication of narrow band allocation information and downlink communication with MTC terminals belonging to the first group within one subframe. On the other hand, the eNB 200 performs none of communication of narrow band allocation information and downlink communication with the MTC terminals belonging to the second group within one subframe.

Figure 30:
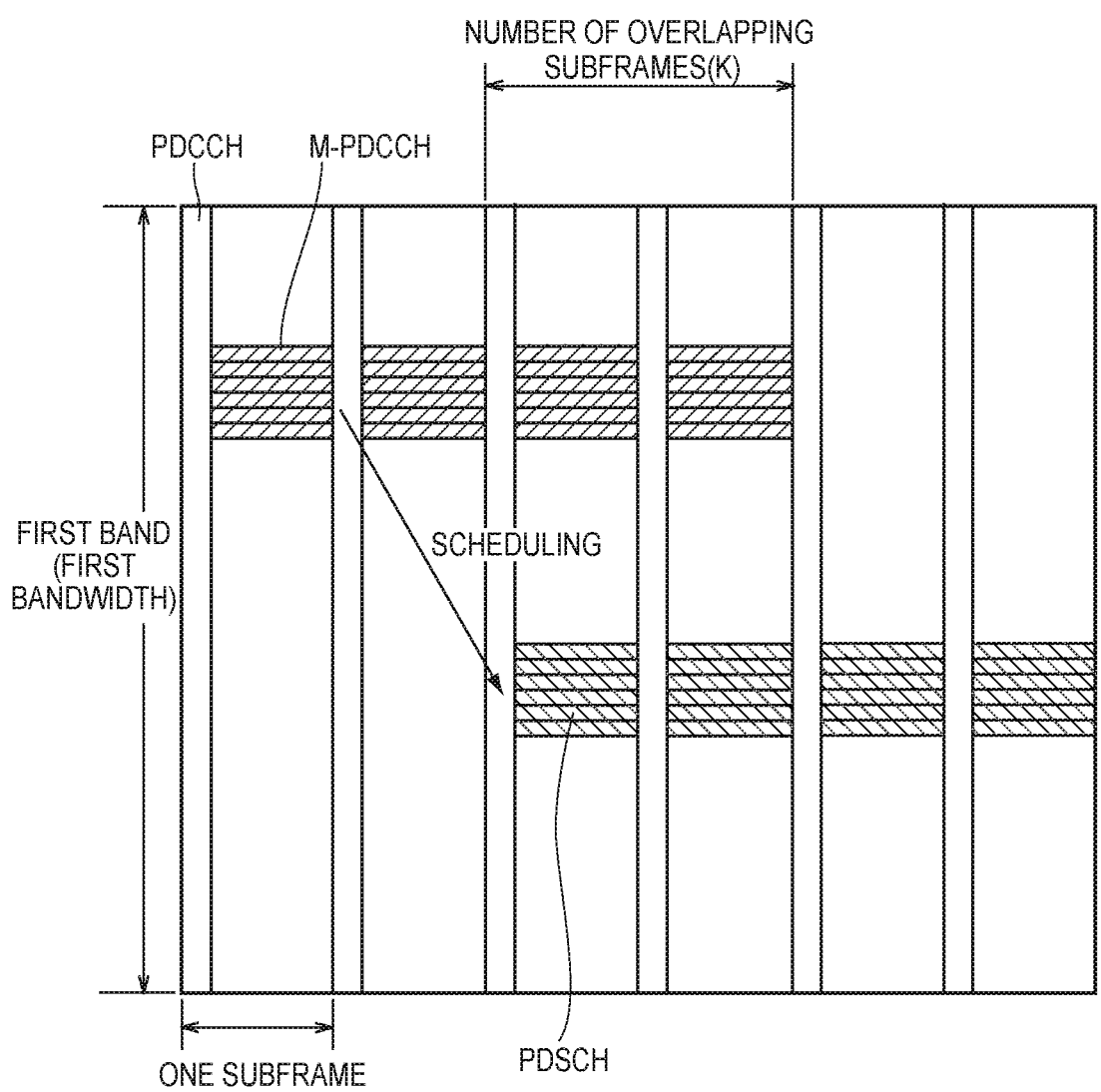
FIG. 30 is a diagram for explaining scheduling according to the fifth modification example.

Next, there will be considered a case where communication of narrow band allocation information and downlink communication are repeatedly performed in a plurality of subframes as illustrated in FIG. 30. In this case, the subframes in which communication of band allocation information is repeated overlap at least some of the subframes in which downlink communication is repeated. The number of subframes in which communication of narrow band allocation information and downlink communication overlap (hereinafter, the number of overlapping subframes K) may be specified by an RRC message. The number of overlapping subframes K may be a fixed value.

In this case, since the number of repetitions of the M-PDCCH (PDSCH) is included in the DCI of the M-PDCCH, if the MTC terminal does not successfully decode the M-PDCCH, the MTC terminal cannot grasp the timing when the repeated transmission of the M-PDCCH (PDSCH) is ended. Therefore, the MTC terminal stores the PDSCH possibly transmitted from the eNB 200 in the buffer until the MTC terminal successfully decodes the M-PDCCH. From this point of view, the number of overlapping subframes K may be set to 1 in order to minimize the amount of PDSCH to be stored in the buffer. On the other hand, from the viewpoint of reducing the delay time of the PDSCH, the number of overlapping subframes K may be a large value.

Figures 31, 32:
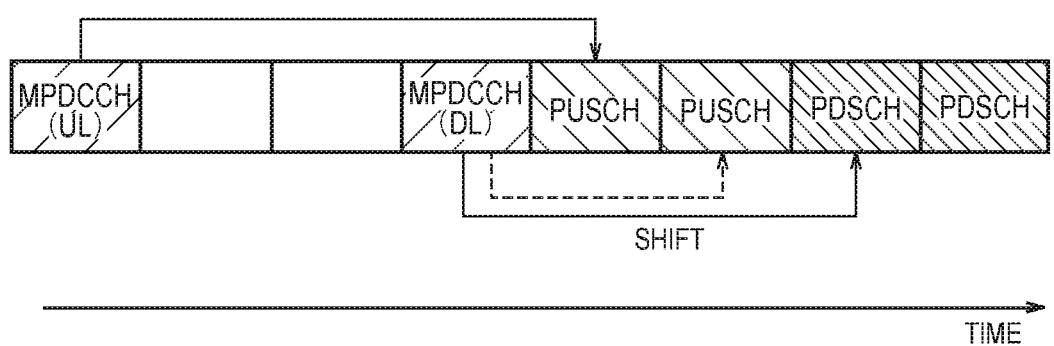
FIG. 31 is a diagram for explaining the number of repetitions according to the fifth modification example.
FIG. 32 is a diagram for explaining scheduling according to the fifth modification example.

The number of repetitions is specified by an RRC message and a DCI. Specifically, as illustrated in FIG. 31, $r_{MAX}$ is specified by the RRC message, and r1 to r4 are specified by the DCI. The number of repetitions is specified by a combination of $r_{MAX}$ and r1 to r4.

[Sixth Modification Example]

A sixth modification example will be described. Differences from the embodiments will be mainly described below.

In relation to the sixth modification example, there will be considered a case where MTC is Half Duplex (HD)-Frequency Division Duplex (FDD). In HD-FDD, either uplink communication or downlink communication is performed.

In this case, when receiving the uplink narrow band allocation information as the narrow band allocation information, the MTC terminal performs uplink communication in the subframe after the first offset from the subframe in which the uplink narrow band allocation information was received. On the other hand, when receiving the downlink narrow band allocation information as the narrow band allocation information, the MTC terminal performs downlink communication in the subframe after the second offset from the subframe in which the downlink narrow band allocation information was received. For example, the first offset is four subframes and the second offset is two subframes.

In this case, as illustrated in FIG. 32, depending on the transmission timing of the uplink narrow band allocation information (M-PDCCH (UL)) and the downlink narrow band allocation information M-PDCCH (DL), the subframe for uplink communication PUSCH) and the subframe for downlink communication (PDSCH) may conflict with each other. The reason for such conflict is that the first offset and the second offset are different, and repeated PUSCH and PDSCH transmissions are performed.

Therefore, when the subframe for the PUSCH is the same as the subframe for the PDSCH, the MTC terminal shifts one of the subframe for the PUSCH and the subframe for the PDSCH in the time direction. In the example illustrated in FIG. 32, since the M-PDCCH (UL) has been transmitted first and the PUSCH transmission has already been performed, the subframe for the PDSCH is shifted. FIG. 32 illustrates a case where the number of repetitions of PUSCH is two.

[Seventh Modification Example]

A seventh modification example will be described. Differences from the embodiments will be mainly described below.

In the seventh modification example, the eNB 200 transmits to the MTC terminal information specifying the bandwidths supportable by the MTC terminal. The information specifying the bandwidths supportable by the MTC terminal is included in an RRC message, for example. The types of bandwidths supportable by the MTC terminal are 5 MHz and 3 MHz, for example. The bandwidth of 5 MHz may include 25 resource blocks (24 resource blocks (=four narrow bands)+one resource block). The bandwidth of 3 MHz may include 15 resource blocks (12 resource blocks (=two narrow bands)+three resource blocks). In this case, the patterns of narrow bands (four narrow bands) allocated to the MTC terminal corresponding to the bandwidth of 5 MHz can be represented by two bits, for example. However, all the patterns of the narrow bands (four narrow bands) allocated to the MTC terminal may be represented by four bits. On the other hand, the patterns of narrow bands (two narrow bands) allocated to the MTC terminal corresponding to the bandwidth of 3 MHz can be represented by one bit, for example. However, all the patterns of the narrow bands (two narrow bands) allocated to the MTC terminal may be represented by two bits.

Under this premise, the eNB 200 transmits to the MTC terminal, the narrow band allocation information including information specifying a pattern of narrow bands to be allocated to the MTC terminal according to the bandwidth supportable by the MTC terminal. That is, the number of bits of narrow band allocation information (that is, DCI of M-PDCCH) can be flexibly changed according to the bandwidth supportable by the MTC terminal.

The position of the narrow band allocated to the MTC terminal may be predetermined in accordance with the bandwidth supportable by the MTC terminal. The position of the narrow band allocated to the MTC terminal may be specified by an RRC message according to the bandwidth supportable by the MTC terminal. The position of the narrow band allocated to the MTC terminal may be specified by the DCI of the M-PDCCH according to the bandwidth supportable by the MTC terminal.

[Eighth Modification Example]

An eighth modification example will be described. Differences from the embodiments will be mainly described below.

In the eighth modification example, the MCS used in MTC will be mainly described. The DCI of the M-PDCCH includes a four-bit field representing the index value ($I_{MCS}$) of the MCS. That is, the possible range of the MCS value is 0 to 15. However, in order to increase the throughput in the MTC, it is considered that a higher throughput MCS is required.

In the eighth modification example, the eNB 200 transmits to the MTC terminal information necessary for replacement reading of the index value of the MCS included in the DCI of the M-PDCCH. The information necessary for replacement reading of the index value of the MCS is included in an RRC message, for example. The information necessary for replacement reading of the index value of the MCS may be included in the DCI of the M-PDCCH.

For example, the MTC terminal has an MCS table illustrated in FIG. 33. The MCS table associates the MCS Index ($I_{MCS}$ described above), modulation order ($Q'_m$), transport block size (TBS) index ($I_{TBS}$), and redundancy vertion ($r_{vIdx}$). That is, the MTC terminal can acquire modulation order ($Q'_m$), TBS index ($I_{TBS}$), and redundancy vertion ($r_{vIdx}$) associated with the index value ($I_{MCS}$) of the MCS from the MCS table.

As described above, the field representing the index value ($I_{MCS}$) of the MCS is four bits. Therefore, when the index value of the MCS is not differently read, the possible range of the index value of the MCS is 0 to 15 as illustrated in FIG. 33.

First, the information necessary for replacement reading of the index value of the MCS may be an offset value to be added to the index value of the MCS (hereinafter referred to as an additional offset value). In this case, as illustrated in FIG. 34, the possible range of MCS index value after replacement (hereinafter referred to as MCS index (replacement read value)) shifts to the high throughput side. In this case, since the additional offset value is 4, the possible range of the MCS index (replacement read value) is 4 to 19.

Secondly, the information necessary for replacement reading of the index value of the MCS may be an offset value to be multiplied by the index value of the MCS (hereinafter referred to as a multiplying offset value). In this case, the possible range of the MCS index (replacement read value) is extended as illustrated in FIG. 34. On the other hand, as the index value of the MCS changes by one level, the change width of the TBS index (that is, the change width of the TBS) increases. In this case, since the multiplying offset value is 2, an even-numbered index can be used as the MCS index (replacement read value) in the MCS table. In other words, the MCS index (replacement read value) specifiable by the index value of the MCS and the MCS index (replacement read value) not specifiable by the index value of the MCS are alternately arranged.

In this case, the additional offset value (offset 1) and the multiplying offset value (offset 2) described above may be combined. Specifically, the replacement reading of the index value of the MCS is performed according to the equation MCS index (replacement read value)=($I_{MCS}$×offset 2)+offset 1. The available additional offset value is 0 or more and is equal to or less than the value obtained by subtracting 1 from the multiplying offset value. For example, in the case illustrated in FIG. 34, assuming that the multiplying offset value is 2 and the additional offset value is 1, an odd-numbered index can be used as the MCS index (replacement read value). Even in this case, the MCS index (replacement read value) specifiable by the index value of the MCS and the MCS index (replacement read value) not specifiable by the index value of the MCS are alternately arranged.

Thirdly, the information necessary for replacement reading of the index value of the MCS may be information specifying the MCS table to be referred to by using the index value of the MCS. For example, in the premise that a plurality of MCS tables is prepared, the information necessary for replacement reading of the index value of the MCS may be information specifying one of the plurality of MCS tables. The MCS tables prepared may be, for example, tables in which rows of MCS index (replacement read value) not specifiable by the index value of MCS are deleted from the MCS tables illustrated in FIGS. 33 to 35. Alternatively, a new MCS table may be defined. The prepared MCS tables may include at least one new MCS table in addition to the existing MCS tables.

Other Embodiments

The present disclosure has been described in terms of the embodiments described above, it should not be understood that the description and drawings constituting a part of this disclosure limit this disclosure. From this disclosure, various alternative embodiments, examples, and operational techniques will be apparent to those skilled in the art.

For example, the following operations may be performed. Differences from the embodiments will be mainly described below.

Figure 36:
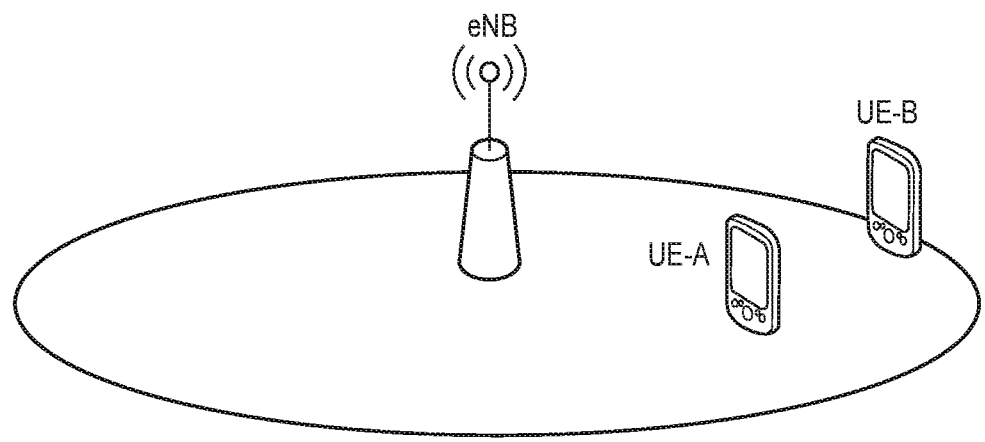
FIG. 36 is a configuration diagram (assumed environment) of a communication system according to another example.

FIG. 36 is a configuration diagram (assumed environment) of a communication system according to another embodiment. A UE-A (first user terminal) is located in the cell of an eNB (base station). A UE-B (second user terminal) is located near the cell of the eNB. The UE-A is in a situation communicable with the UE-B. The UE-A is a terminal (relay UE) capable of relaying communication from the eNB to the UE-B. The UE-B may be a wearable terminal. The communication between the UE-A and the UE-B may use a device-to-device (D2D) technology.

Figure 37:
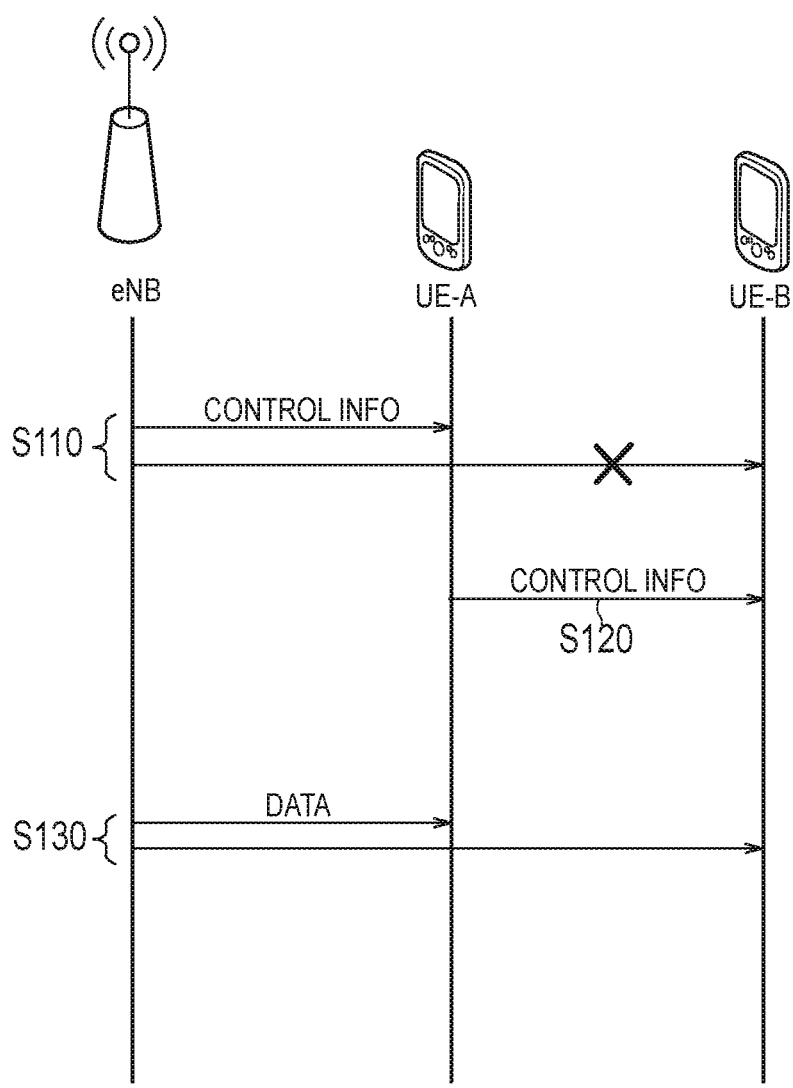
FIG. 37 is a sequence diagram according to another embodiment.

FIG. 37 is a sequence diagram according to another example. Communication between the eNB and the UE-A may be performed using a first bandwidth that is wider than the second bandwidth. Communication between the eNB and the UE-B may be performed using a narrow band of the second bandwidth narrower than the first bandwidth. Communication between the UE-A and the UE-B may be performed using a narrow band of the second bandwidth narrower than the first bandwidth.

In step S110, the eNB transmits control information to the UE-A. The UE-A receives control information from the eNB. The UE-B may not be able to receive the control information directly from the eNB. The eNB transmits the control information including the narrow band allocation information (control info or control information) to the UE-A or the UE-B.

The control information transmitted from the eNB to the UE-A may be SIB. The SIB transmitted from the eNB to the UE-A may be the SIB defined for the MTC. The control information transmitted from the eNB to the UE-A may be MIB. The control information transmitted from the eNB to the UE-A may be a dedicatedly transmitted RRC message (RRC message). The control information transmitted from the eNB to the UE-A may be a DCI message of the PHY layer transmitted dedicatedly (DCI message).

The control information transmitted from the eNB to the UE-B may be SIB. The SIB transmitted from the eNB to the UE-B may be the SIB defined for the MTC. The control information transmitted from the eNB to the UE-B may be MIB. The control information transmitted from the eNB to the UE-B may be a dedicatedly transmitted RRC message (RRC message). The control information transmitted from the eNB to the UE-B may be a DCI message of the PHY layer transmitted dedicatedly (DCI message).

The control information may be an upper layer parameter (for example, RRC). When the control information is a DCI message, sufficient time may be provided between the control information and the data.

When the UE-B fails to receive the control information transmitted at a specific timing from the eNB, the UE-B may attempt to receive the control information from the UE-A (relay UE). Whether the UE-B receives the control information from the relay UE may be preset from the eNB.

In step S120, the UE-A transmits the control information to the UE-B. The UE-B receives the control information.

The UE-A can relay the control information received from the eNB to the UE-B. The UE-A may always relay the control information to the UE-B. The UE-A may relay the control information to the UE-B only when receiving relay indication (signal). The UE-A may relay the control information to the specific UE. When the destination (for example, the UE-B) is specified in the relay indication signal, the UE-A may relay the control information to the UE specified as the destination. The relay indication signal may include a destination cell radio network temporary identifier (C-RNTI). The relay indication signal may include a relay RNTI for decoding (coding) the relay data.

The UE-A transmits the control information including the narrow band allocation information to the UE-B. The transmission from the UE-A to the UE-B may be performed using a unique radio network temporary identifier (RNTI) between the UE-A and the UE-B. The control information transmitted from the UE-A to the UE-B may be the SIB defined for MTC.

Resources for relaying may be notified by the eNB to the UE-A (relaying UE). The resources for relaying may be predetermined in advance.

Even if the UE-B fails to receive the control information from the eNB, the UE-B can receive the narrow band allocation information allocated by the eNB from the UE-A. As a result, the eNB can transmit the narrow band allocation information to the UE-B.

In step S130, the eNB transmits data to the UE-A and the UE-B. The UE-A receives the data from the eNB. The UE-B receives the data from the eNB. When the UE-B succeeds in receiving the control information from the UE-A (relay UE), the UE-B can receive the data according to the control information. The data is information transmitted through the PDSCH. The frequency use band of the data may be different from the frequency use band of the control information.

In relation to the foregoing embodiments (operation examples), the case where the MTC is downlink communication has been described. However, the present invention is not limited to this case. The embodiments are also applicable to a case where the MTC is uplink communication.

Although not specifically mentioned in relation to the embodiment, there may be provided programs for causing a computer to execute processes performed by the UE 100 and the eNB 200. The programs may be recorded on a computer readable medium. Using the computer readable medium makes it possible to install the programs in a computer. In this case, the computer readable medium on which the programs are recorded may be a non-transitory recording medium. The non-transitory recording medium is not particularly limited, but it may be a recording medium such as CD-ROM or DVD-ROM, for example.

Alternatively, there may be provided a chip formed from a memory that stores the programs for executing the process to be performed by the UE 100 and the eNB 200, and a processor that executes the programs stored in the memory.

In relation to the embodiments, the LTE system has been described as an example of the mobile communication system. However, the embodiment is not limited to this. The mobile communication system may be a system other than the LTE system.

[Supplementary Note A]

(A1) Larger Maximum PDSCH/PUSCH Channel Bandwidth

It agreed to support wider channel bandwidth [5 or 20 MHz] for BL UEs and non-BL UEs in CE mode A with reusing the Rel.13 MPDCCH design. According to these agreements, MPDCCH can indicate RBs corresponding to [5 MHz or 20 MHz] for PDSCH. There are two options to indicate the wider PDSCH/PUSCH by MPDCCH. FIG. 38 is a diagram for explaining two options for wider PDSCH/PUSCH for FeMTC service. In FIG. 38A, a single MPDCCH indicates multiple NBs. In FIG. 38B, a single MPDCCH indicates NBs constituting N RBs.

First, as shown in FIG. 8A, MPDCCH can indicated the N×NB (6 RBs) of PDSCH/PUSCH. In this case, new DCI format of MPCCH should be defined to indicate the multiples NBs.

Second one is shown in FIG. 38B simply widening the channel-bandwidth of NB channel from 6 RBs to N RBs. In this case, number of RBs within each NB is changed. For example, if the UE supports the 5 MHz bandwidth in 10 MHz system bandwidth, 10 MHz may be divided into two NBs, then one NB is consist of 25 RBs. In this case, new DCI format of MPDCCH should be define to indicate the larger number of RBs because current DCI format 6-0A/6-1A(/6-0B/6-1B) is not capable of such assignments. Frequency hopping is another option to support wider channel bandwidths; however, there is risk of increase in complexity since the design will have to consider avoiding overlapping with the legacy resource allocation. To keep co-existence with the legacy MTC devices, method of MPDCCH indicating multiple NBs should be supported for larger maximum bandwidth. In addition to keep low MTC device complexity, the Rel.-14 FeMTC UE should only support contiguous RF bandwidths corresponding to UE capability such as 5 MHz. Taking UL transmission into account, NB resource allocation should contiguous to maintain the low PAPR for power consumption.

Proposal 1: To keep co-existence with legacy MTC devices, a single MPDCCH indicating to multiple NBs should be supported for larger maximum bandwidth.

Proposal 2: If a single MPDCCH indicating to multiple NBs is supported then a new DCI format must be considered.

Proposal 3: To keep low MTC device complexity, the Rel.-14 FeMTC UE should only support contiguous RF bandwidths corresponding to UE capability.

Proposal 4: To keep low PAPR, if MPDCCH indicating to the multiple NBs for PUSCH, the NB assignment should be contiguous.

(A2) Same Subframe Scheduling

Figure 39:
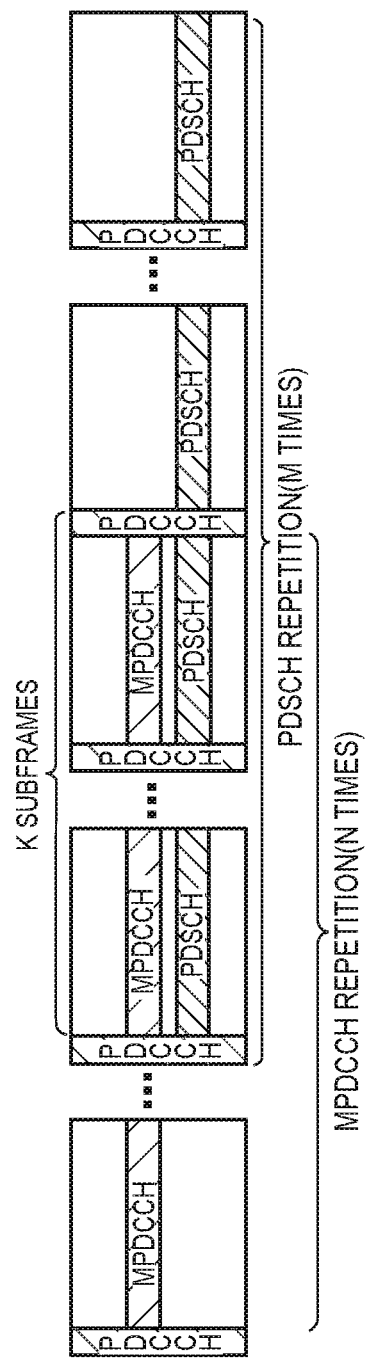
FIG. 39 is a diagram for explaining an outline of the same sub-frame scheduling for FeMTC.

Cross subframe scheduling by MPDCCH was agreed for wider bandwidth PDSCH/PUSCH. In the Rel.13 eMTC, cross-subframe scheduling is applied because the number of RBs within NBs is quite limited which does not allow same-subframe scheduling. However, if UE can receive more than 6 RBs due to support for wider channel bandwidth then there are enough resources to transmit MPDCCH and PDSCH in the same subframe. Same subframe scheduling is more efficient since it decreases the latency, especially in the low repetition cases. As shown in the FIG. 39, if the same subframe scheduling is applied for the last subframes of the MPDCCH repetitions then there is no need for buffering of the PDSCH data. However, there might be some devices that are able to successfully decode the MPDCCH early such that they can start decoding the associated PDSCH early as well. It is given the total bandwidth including the gap between the MPDCCH and PDSCH in the same subframe has to be less than UE capability such as 5 MHz.

Proposal 5: Rel.14 BL UE should be considered to support same subframe scheduling.

[Supplementary Note B]

(B1) Introduction

Further Enhanced MTC for LTE WI was approved, which includes a task to support the higher data rate than 1 Mbps for voice capable wearable devices and health monitoring devices. To support more than 1 Mbps larger TBS size supporting agreements were made. In this supplementary note, we share our views on the design for larger maximum TBS size (B2) TBS/MCS Design (B 2.1) UE with 1.4 MHz Bandwidth in TDD/HD-FDD Maximum UL TBS for CE Mode A UEs with maximum 1.4 MHz bandwidth in TDD/HD-FDD can support 2984 bits. On the other hand, DCI format 6-0A for CE Mode A contains only 4-bit MCS indexes; Hence, 4-bit MCS indexes only support 1736 bits with 1.4 MHz shown in FIG. 40. In order to support 2984 bits with 1.4 MHz bandwidth, at least MCS value of 23 (IMCS=23) should be included as indicated in FIG. 41, IMCS=23 corresponding to 2984 bits. In other words, UE should support 64-QAM transmissions.

Proposal 1: 64-QAM transmissions should be supported for UL TBS 2984 bits for 1.4 MHz channel bandwidth.

To support higher MCS indexes, it needs to consider how eNB indicates higher MCS indexes such as IMCS 23 to UE. There are the two possible approaches. The first approach is to define, a new DCI format to support higher MCS. The second approach is to simply change the interpretation of one of the legacy DCI formats. The second approach is much simpler because it allows the reuse one of the existing DCI formats with the RRC signaling based configuration to indicate the new UE behavior. This approach has the minimum impact on the specifications For example, when UE receives the interpretation indication via RRC signaling the UE could switch to the new MCS index interpretation where each MCS index maps to every other alternate MCS value. For example, an offset indicator is used to define whether the MCS starts from index 0 or 0+offset value. Additionally, a new MCS index interpretation supports the interlace MCS value such as only supporting odd or even MCS value. This method allows supporting higher MCS values as well as it dynamically adapts to the channel conditions.

Proposal 2: RRC signaling based change of the interpretation of MCS values of the legacy DCI formats should be supported. Details of interpretation should be discussed.

(B2.2) BL UEs Supporting Larger UE Channel BW

A larger maximum UE channel BW for PDSCH and PUSCH in RRC connected mode is 5 MHz for Rel-14 BL UEs in CE mode A. In addition, this eNB/UE can support at least 2984 bits for PUSCH/PDSCH. The support for both the larger TBS and wider bandwidth allows us to consider whether 64QAM transmissions should be supported for MTC UL in LTE Rel.-14. The 64QAM transmission has a benefit of requiring a smaller number of RBs to carry a given TBS resulting in more scheduling flexibility to the eNB and higher efficiency. In UL case, narrow band usage has a better link budget and performance due to higher PSD of the received signal at the eNB. Additionally, as mentioned above, Rel.14 TDD/HD-FDD UEs should support 64-QAM transmission to transmit 2984 bits. Therefore, BL UEs supporting larger maximum BW also support the 64-QAM modulation. A new DCI format for 64QAM is a further task.

Proposal 3: BL UEs supporting larger maximum BW also should support the 64QAM modulation.

The invention claimed is:

1. A mobile communication method used in a user terminal comprising:
   receiving, from a base station, narrow band allocation information allocating two or more narrow bands to the user terminal; and
   performing communication by using the two or more narrow bands based on the narrow band allocation information, wherein
   the two or more narrow bands are provided within a bandwidth supportable by the user terminal, and
   the narrow band allocation information includes a start index that specifies one of a plurality of narrow bands and a number index that specifies a number of the two or more narrow bands, wherein
   the plurality of narrow bands is classified into two or more groups, and
   the two or more narrow bands is selected based on the number index from among a group including the narrow band specified by the start index.

2. The mobile communication method according to claim 1, wherein
   the narrow band allocation information includes information for allocating two or more subframes to a second user terminal, and
   performing the communication by using the two or more narrow bands includes performing the communication by using a narrow band included in the two or more subframes based on the information for allocating the two or more subframes.

3. The mobile communication method according to claim 2, wherein the narrow band allocation information includes information specifying whether to perform frequency hopping of the narrow bands in the two or more subframes.

4. The mobile communication method according to claim 1, wherein
   the communication is downlink communication from the base station to the user terminal, and the two or more narrow bands are separated in a frequency direction.

5. The mobile communication method according to claim 1, wherein
the communication is downlink communication from the base station to the user terminal, and
in each of the two or more groups, narrow bands included in each of the two or more groups are separated in a frequency direction.

6. The mobile communication method according to claim 1, further comprising receiving from the base station, information specifying a pattern of frequency hopping of the two or more narrow bands and information specifying a resource block to be allocated to the user terminal in the two or more narrow bands.

7. The mobile communication method according to claim 6, wherein
the pattern of the frequency hopping applied to the user terminal is the same as a pattern of frequency hopping applied to another user terminal using one narrow band included in the two or more narrow bands, and
the resource block allocated to the user terminal in the two or more narrow bands is different from a resource block allocated to the another user terminal in the one narrow band.

8. The mobile communication method according to claim 6, wherein
the plurality of narrow bands is classified into two or more groups,
the number of the two or more groups is determined by the number of times hopping is performed in the frequency hopping applied to the user terminal, and
the frequency hopping applied to the user terminal is performed between the two or more groups while maintaining a state in which the two or more narrow bands are included in one group.

9. The mobile communication method according to claim 1, wherein the narrow band allocation information includes blank information specifying a blank resource block not to be allocated to the user terminal in the two or more narrow bands.

10. The mobile communication method according to claim 9, wherein the blank information includes information specifying a narrow band to which the blank resource block is applied and information specifying a position of the blank resource block.

11. The mobile communication method according to claim 9, wherein
the two or more narrow bands are consecutive in a frequency direction,
the user terminal is configured to use consecutive resource blocks in resource blocks included in the two or more narrow bands, and
the blank information includes information specifying a level of frequency at which the blank resource block is to be arranged, and information specifying a number of the blank resource blocks.

12. The mobile communication method according to claim 9, wherein
the two or more narrow bands are consecutive in a frequency direction,
the user terminal is configured to use consecutive resource blocks in resource blocks included in the two or more narrow bands, and
the blank information includes information specifying an arrangement of the blank resource block.

13. A user terminal comprising a processor and a memory, the processor being configured to:
receive, from a base station, narrow band allocation information allocating two or more narrow bands to the user terminal; and
perform communication by using the two or more narrow bands based on the narrow band allocation information, wherein
the two or more narrow bands are provided within a bandwidth supportable by the user terminal, and
the narrow band allocation information includes a start index that specifies one of a plurality of narrow bands and a number index that specifies a number of the two or more narrow bands, wherein
the plurality of narrow bands is classified into two or more groups, and
the two or more narrow bands is selected based on the number index from among a group including the narrow band specified by the start index.

14. An apparatus provided in a user terminal, the apparatus comprising a processor and a memory, the processor being configured to:
receive, from a base station, narrow band allocation information allocating two or more narrow bands to the user terminal; and
perform communication by using the two or more narrow bands based on the narrow band allocation information, wherein
the two or more narrow bands are provided within a bandwidth supportable by the user terminal, and
the narrow band allocation information includes a start index that specifies one of a plurality of narrow bands and a number index that specifies a number of the two or more narrow bands, wherein
the plurality of narrow bands is classified into two or more groups, and
the two or more narrow bands is selected based on the number index from among a group including the narrow band specified by the start index.

* * * * *